United States Patent
Hosseini et al.

(10) Patent No.: US 11,031,985 B2
(45) Date of Patent: Jun. 8, 2021

(54) CHANNEL STATE INFORMATION COMPUTATION USING A CONTROL RESOURCE ASSUMPTION

(71) Applicant: QUALCOMM Incorporated, San Diego, CA (US)

(72) Inventors: Seyedkianoush Hosseini, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 16/136,668

(22) Filed: Sep. 20, 2018

(65) Prior Publication Data

US 2019/0089438 A1   Mar. 21, 2019

Related U.S. Application Data

(60) Provisional application No. 62/561,668, filed on Sep. 21, 2017.

(51) Int. Cl.
*H04B 7/06* (2006.01)
*H04W 24/10* (2009.01)
(Continued)

(52) U.S. Cl.
CPC ......... *H04B 7/0626* (2013.01); *H04L 1/0026* (2013.01); *H04L 5/0053* (2013.01);
(Continued)

(58) Field of Classification Search
CPC ... H04B 7/0626; H04B 7/0413; H04L 1/0026; H04L 5/0053; H04L 5/0064; H04W 76/27; H04W 24/10
See application file for complete search history.

(56) References Cited

U.S. PATENT DOCUMENTS

2011/0319068 A1*  12/2011  Kim .................. H04W 72/0453
                                                       455/422.1
2014/0078919 A1*   3/2014  Hammarwall ........ H04L 1/0026
                                                       370/252
(Continued)

FOREIGN PATENT DOCUMENTS

EP        3355639 A1     8/2018
WO   WO-2017071417 A1    5/2017
WO   WO-2018064426 A1    4/2018

OTHER PUBLICATIONS

International Search Report and Written Opinion—PCT/US2018/052159—ISA/EPO—dated Jan. 16, 2019.
(Continued)

*Primary Examiner* — Habte Mered
(74) *Attorney, Agent, or Firm* — QUALCOMM Incorporated

(57) ABSTRACT

Methods, systems, and devices for wireless communications are described. A user equipment (UE) may adjust control overhead assumptions when reporting a channel state indictor (CSI). A base station may configure resource block (RB) sets for the UE by radio resource control (RRC) signaling. The UE may assume that the RB sets as configured are assigned for control information. When the UE reports wideband CSI, it may be assumed that the resources for an RB set are not available for data transmission. Any portion of a band configured for the UE overlapping with an RB set may be considered unavailable for data transmission. The UE may then calculate CSI based on the updated control overhead assumption. In other examples, the UE may make a worst-case assumption for control overhead. In some cases, the UE may assume there is no control overhead.

26 Claims, 16 Drawing Sheets

(51) Int. Cl.
*H04W 76/27* (2018.01)
*H04L 1/00* (2006.01)
*H04L 5/00* (2006.01)
*H04B 7/0413* (2017.01)

(52) U.S. Cl.
CPC ........... *H04W 24/10* (2013.01); *H04W 76/27* (2018.02); *H04B 7/0413* (2013.01); *H04L 5/0064* (2013.01)

(56) References Cited

U.S. PATENT DOCUMENTS

| | | | | |
|---|---|---|---|---|
| 2014/0301293 | A1* | 10/2014 | Geirhofer | H04L 1/0026 370/329 |
| 2015/0304995 | A1* | 10/2015 | Yi | H04L 5/0007 370/329 |
| 2016/0020879 | A1* | 1/2016 | Shimezawa | H04W 72/04 370/329 |
| 2016/0029351 | A1* | 1/2016 | Shimezawa | H04W 72/042 370/329 |
| 2016/0218788 | A1* | 7/2016 | Yum | H04B 7/0626 |
| 2016/0323901 | A1* | 11/2016 | Yum | H04L 5/0057 |
| 2018/0098235 | A1* | 4/2018 | Bagheri | H04L 5/0048 |
| 2018/0337757 | A1* | 11/2018 | Noh | H04L 5/0048 |
| 2019/0115964 | A1* | 4/2019 | Yum | H04B 7/0632 |
| 2019/0190673 | A1* | 6/2019 | Kwak | H04B 7/0421 |
| 2019/0245672 | A1* | 8/2019 | Fehrenbach | H04L 5/0007 |
| 2019/0349052 | A1* | 11/2019 | Yum | H04W 24/10 |

OTHER PUBLICATIONS

Qualcomm Incorporated: "sPDCCH Design for Shortened TTI," 3GPP Draft; R1-1708768 SPDCCH Design for Shortened TTI, vol. RAN WG1, No. Hangzhou, China; May 15, 2017-May 19, 2017, May 14, 2017, XP051273951, 11 pages, Retrieved from the Internet: URL: http://www.3gpp.org/ftp/Meetings_3GPP_SYNC/RAN1/Docs/ [retrieved on May 14, 2017].

* cited by examiner

CHANNEL STATE INFORMATION COMPUTATION USING A CONTROL RESOURCE ASSUMPTION

CROSS REFERENCES

The present application for patent claims the benefit of U.S. Provisional Patent Application No. 62/561,668 by HOSSEINI, et al., entitled "CHANNEL STATE INFORMATION COMPUTATION USING A CONTROL RESOURCE ASSUMPTION," filed Sep. 21, 2017, assigned to the assignee hereof, and expressly incorporated by reference herein.

BACKGROUND

The following relates generally to wireless communication, and more specifically to control overhead assumptions for channel state information computation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may report information regarding channel conditions to a base station. For example, a UE may report channel state information (CSI) to a base station for a set of reference resources, including resources defined in time and frequency. In some cases, the CSI computation may rely on an assumption of a number of resources used for data and control in the reference resources. However, an assumption of control resources used in one wireless system may not be appropriate for another wireless system, such as a system supporting narrowband communications or low latency communications. For example, some bands used for narrowband communications may include a smaller number of control resources or no control information at all as compared to wideband communications. Thus, through an inaccurate assumption of control resources, the UE may report a CSI worse than a CSI that the channel conditions may actually support, which may negatively impact communications scheduling and efficiency.

SUMMARY

A user equipment (UE) may efficiently perform channel state information (CSI) calculations for various CSI reporting schemes, which may be used to enhance low latency communications with a base station. For example, a base station may configure resource block (RB) sets for a UE via radio resource control (RRC) signaling. The UE may then use the configured RB sets when computing CSI such that an assumption of a number and/or size of resources used for short physical downlink control channel (sPDCCH) transmissions (e.g., control information) does not need to be made. Rather, the UE may accurately calculate CSI based on the actual configured resources used for control information. In other examples, when reporting CSI for a set of sub-bands, an assumption that there is no sPDCCH overhead in each sub-band may be used. In such cases, each sub-band may be scheduled by an RB set outside of the sub-band, and the assumption that there is no control overhead may enable appropriate testing of the reported CSI. Additionally or alternatively, the UE may assume that a maximum number of resources within the RB sets are assigned for control information. Thus, when the UE calculates a wideband CSI report, it may be assumed that a maximum number of resources associated with one or more RB sets are not available for data transmission.

A method of wireless communication at a UE is described. The method may include receiving, from a base station, an indication of a UE-specific RB set configuration, the RB set configuration associated with one or more RB sets including control resources for the UE within one or more radio frequency (RF) bands, calculating CSI based on the RB set configuration, and transmitting a CSI report including the calculated CSI to the base station.

An apparatus for wireless communication at a UE is described. The apparatus may include a processor, memory in electronic communication with the processor, and instructions stored in the memory. The instructions may be executable by the processor to cause the apparatus to receive, from a base station, an indication of a UE-specific RB set configuration, the RB set configuration associated with one or more RB sets including control resources for the UE within one or more RF bands, calculate CSI based on the RB set configuration, and transmit a CSI report including the calculated CSI to the base station.

Another apparatus for wireless communication at a UE is described. The apparatus may include means for receiving, from a base station, an indication of a UE-specific RB set configuration, the RB set configuration associated with one or more RB sets including control resources for the UE within one or more RF bands, calculating CSI based on the RB set configuration, and transmitting a CSI report including the calculated CSI to the base station.

A non-transitory computer-readable medium storing code for wireless communication at a UE is described. The code may include instructions executable by a processor to receive, from a base station, an indication of a UE-specific RB set configuration, the RB set configuration associated with one or more RB sets including control resources for the UE within one or more RF bands, calculate CSI based on the RB set configuration, and transmit a CSI report including the calculated CSI to the base station.

Some examples of the method, apparatuses, and non-transitory computer-readable medium described herein may further include operations, features, means, or instructions for calculating the CSI based on a number of the one or more RB sets and a size of the one or more RB sets, where the number of the one or more RB sets and the size of the one or more RB sets may be in accordance with the RB set configuration.

Some examples of the method, apparatuses, and non-transitory computer-readable medium described herein may further include operations, features, means, or instructions for calculating the CSI based on an assumption that each of the one or more RB sets may be assigned to an sPDCCH.

Some examples of the method, apparatuses, and non-transitory computer-readable medium described herein may further include operations, features, means, or instructions for calculating the CSI based on an assumption that each of the one or more RB sets may be unavailable for data transmissions, where the CSI report may be based on a wideband CSI reporting scheme.

Some examples of the method, apparatuses, and non-transitory computer-readable medium described herein may further include operations, features, means, or instructions for determining that a portion of a sub-band of the one or more RF bands may be overlapping with the one or more RB sets based on the RB set configuration and calculating the CSI based on an assumption that the portion of the sub-band may be unavailable for data transmissions, where the CSI report may be based on a sub-band CSI reporting scheme.

Some examples of the method, apparatuses, and non-transitory computer-readable medium described herein may further include operations, features, means, or instructions for performing rate matching around a first portion of the one or more RB sets that includes an sPDCCH based on an assumption that a second portion of the one or more RB sets may be available for data transmissions, the first portion being different from the second portion.

In some examples of the method, apparatuses, and non-transitory computer-readable medium described herein, the sPDCCH includes an uplink resource grant, or a downlink resource grant, or a combination thereof.

Some examples of the method, apparatuses, and non-transitory computer-readable medium described herein may further include operations, features, means, or instructions for performing rate matching around a first portion of a first RB set that includes an sPDCCH based on an assumption that a second portion of the first RB sets may be available for data transmissions, the first portion being different from the second portion and performing rate matching around a second RB set.

In some examples of the method, apparatuses, and non-transitory computer-readable medium described herein, the sPDCCH includes an uplink resource grant, or a downlink resource grant, or a combination thereof.

Some examples of the method, apparatuses, and non-transitory computer-readable medium described herein may further include operations, features, means, or instructions for identifying a set of CSI reference resources to be used for calculating CSI, calculating a channel quality indicator (CQI) for the CSI reference resources based on an assumption that the control resources of the one or more RB sets may be control overhead, the control resources of the one or more RB sets being removed from the CSI reference resources for calculating CQI and transmitting the calculated CQI as part of the CSI report.

Some examples of the method, apparatuses, and non-transitory computer-readable medium described herein may further include operations, features, means, or instructions for transmitting the CSI report during a first TTI that may have a duration that may be less than that of a second TTI, where the first TTI includes a short TTI (sTTI).

Some examples of the method, apparatuses, and non-transitory computer-readable medium described herein may further include operations, features, means, or instructions for receiving the RB set configuration via RRC messaging.

In some examples of the method, apparatuses, and non-transitory computer-readable medium described herein, the one or more RF bands include a wideband RF band or RF sub-bands.

A method of wireless communication at a UE is described. The method may include identifying a set of CSI reference resources for each RF sub-band of a set of RF sub-bands, calculating CSI for each RF sub-band based on an assumption that there is no control overhead within the CSI reference resources, and transmitting a CSI report including the calculated CSI to the base station.

An apparatus for wireless communication at a UE is described. The apparatus may include a processor, memory in electronic communication with the processor, and instructions stored in the memory. The instructions may be executable by the processor to cause the apparatus to identify a set of CSI reference resources for each RF sub-band of a set of RF sub-bands, calculate CSI for each RF sub-band based on an assumption that there is no control overhead within the CSI reference resources, and transmit a CSI report including the calculated CSI to the base station.

Another apparatus for wireless communication at a UE is described. The apparatus may include means for identifying a set of CSI reference resources for each RF sub-band of a set of RF sub-bands, calculating CSI for each RF sub-band based on an assumption that there is no control overhead within the CSI reference resources, and transmitting a CSI report including the calculated CSI to the base station.

A non-transitory computer-readable medium storing code for wireless communication at a UE is described. The code may include instructions executable by a processor to identify a set of CSI reference resources for each RF sub-band of a set of RF sub-bands, calculate CSI for each RF sub-band based on an assumption that there is no control overhead within the CSI reference resources, and transmit a CSI report including the calculated CSI to the base station.

In some examples of the method, apparatuses, and non-transitory computer-readable medium described herein, a first RF sub-band of the set of RF sub-bands may be scheduled by a first RB set in accordance with an RF set configuration, the first RB set being located outside of the first RF sub-band.

Some examples of the method, apparatuses, and non-transitory computer-readable medium described herein may further include operations, features, means, or instructions for calculating CSI for the first RF sub-band based on an assumption that a second RB set located within the second RF sub-band may be available for data transmissions.

Some examples of the method, apparatuses, and non-transitory computer-readable medium described herein may further include operations, features, means, or instructions for calculating CSI for the first RF sub-band based on an assumption that the first RF sub-band excludes a second RF set.

A method of wireless communication at a base station is described. The method may include determining a UE-specific RB set configuration for a UE, the RB set configuration associated with one or more RB sets including control resources for the UE within one or more RF bands and transmitting, to the UE, an indication of the RB set configuration for CSI calculation.

An apparatus for wireless communication at a base station is described. The apparatus may include a processor, memory in electronic communication with the processor, and instructions stored in the memory. The instructions may be executable by the processor to cause the apparatus to determine a UE-specific RB set configuration for a UE, the RB set configuration associated with one or more RB sets including control resources for the UE within one or more RF bands and transmit, to the UE, an indication of the RB set configuration for CSI calculation.

Another apparatus for wireless communication at a base station is described. The apparatus may include means for determining a UE-specific RB set configuration for a UE, the RB set configuration associated with one or more RB sets including control resources for the UE within one or more RF bands and transmitting, to the UE, an indication of the RB set configuration for CSI calculation.

A non-transitory computer-readable medium storing code for wireless communication at a base station is described. The code may include instructions executable by a processor to determine a UE-specific RB set configuration for a UE, the RB set configuration associated with one or more RB sets including control resources for the UE within one or more RF bands and transmit, to the UE, an indication of the RB set configuration for CSI calculation.

Some examples of the method, apparatuses, and non-transitory computer-readable medium described herein may further include operations, features, means, or instructions for receiving a CSI report from the UE, the CSI report including CSI that may be based on the RB set configuration.

Some examples of the method, apparatuses, and non-transitory computer-readable medium described herein may further include operations, features, means, or instructions for receiving the CSI report during a TTI that may have a duration that may be less than that of another TTI.

DETAILED DESCRIPTION

Figure 1:
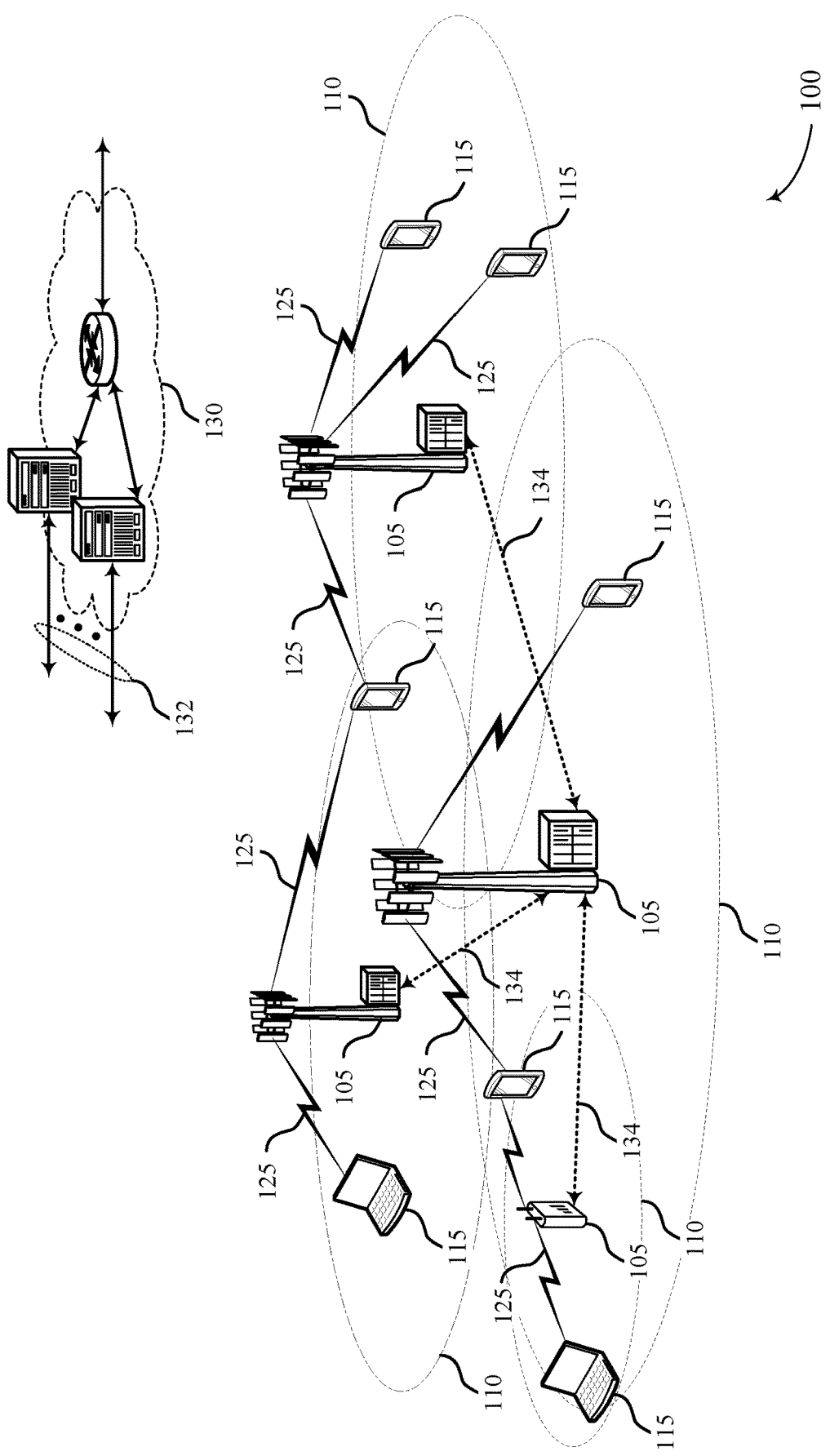
FIG. 1 illustrates an example of a system for wireless communication that supports channel state information computation using a control resource assumption in accordance with aspects of the present disclosure.

A user equipment (UE) may report channel state information (CSI) to a base station for a reference resource, including resources defined in time and frequency such as resource elements. The CSI may include a channel quality indicator (CQI) index, which may indicate the quality of downlink channels. The UE may compute the CQI index based on a number of resource elements configured for data transmission in the reference resource. The UE may assume that a number of resource elements of the reference resource are configured for control information and disregard the resource elements assumed to be used for control information when determining CQI and reflected in a CSI report. However, a control overhead assumption for one wireless communications system may not be appropriate for another wireless system, as the amount or distribution of control information may vary between wireless communications systems. For example, the UE and base station may support narrowband communications, and may utilize multiple sub-bands up to two resource block (RB) sets of configurable size for transmitting a short physical downlink control channel (sPDCCH). Thus, the UE and base station may use some sub-bands which may not include RB sets and therefore do not have a control overhead.

To more accurately calculate CSI, the UE may adjust control overhead assumptions for determining a CQI index. In some examples, the UE may determine that configured RB sets are assigned for sPDCCH transmissions (e.g., control information). Thus, the RB sets, as configured by radio resource control (RRC) signaling, may be the actual control overhead, and the UE may be aware of the size and number of one or more RB sets that comprise control overhead (e.g., the resources used for control signaling). In such cases, the UE may calculate CSI based on the configured resources. In such cases, the CSI may be reported more frequently than the RB set configuration changes. For example, in a system that supports low latency communications (e.g., ultra-reliable low latency communications (URLLC) or a system using short transmission time intervals (sTTIs)), the CSI may be reported more frequently than RRC signaling that updates the RB set configuration. However, should the RB set configuration be updated, the UE may proceed to report CSI based on the received configuration (e.g., during one or more sTTIs). When the UE reports wideband CSI, it may be assumed that the RB sets are not available for data transmission. Additionally, any portion of a sub-band overlapping with any of the RB sets may not be available for data transmission when reporting CSI in accordance with a sub-band CSI reporting scheme. In other examples, the UE may make a worst-case assumption for control overhead when reporting CSI. For example, the UE may assume two RB sets of maximum size when calculating CSI. Additionally or alternative, the UE may assume that there is no control overhead in a set of sub-bands, where each sub-band may be scheduled by an RB set outside of the respective sub-bands.

Aspects of the disclosure are initially described in the context of a wireless communications system. Aspects of the disclosure are further illustrated by and described with reference to apparatus diagrams, system diagrams, and flowcharts that relate to channel state information computation using a control resource assumption.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an ×2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In wireless communications system 100, a UE 115 may efficiently perform CSI calculations for various CSI reporting schemes, which may be used to enhance low latency communications with a base station 105. For example, a base station 105 may configure RB sets for a UE 115 via RRC signaling. The UE 115 may then use the configured RB sets when computing CSI such that an assumption of a number and/or size of resources used for sPDCCH transmissions (e.g., control information) does not need to be made. Rather, the UE 115 may accurately calculate CSI based on the actual configured resources used for control information. In other examples, when reporting CSI for a set of sub-bands, an assumption that there is no sPDCCH overhead in each sub-band may be used. In such cases, each sub-band may be scheduled by an RB set outside of the sub-band, and the assumption that there is no control overhead may enable appropriate testing of the reported CSI. Additionally or alternatively, the UE 115 may assume that a maximum number of resources within the RB sets are assigned for control information. Thus, when the UE 115 calculates a wideband CSI report, it may be assumed that a maximum number of resources associated with one or more RB sets are not available for data transmission.

Figure 2:
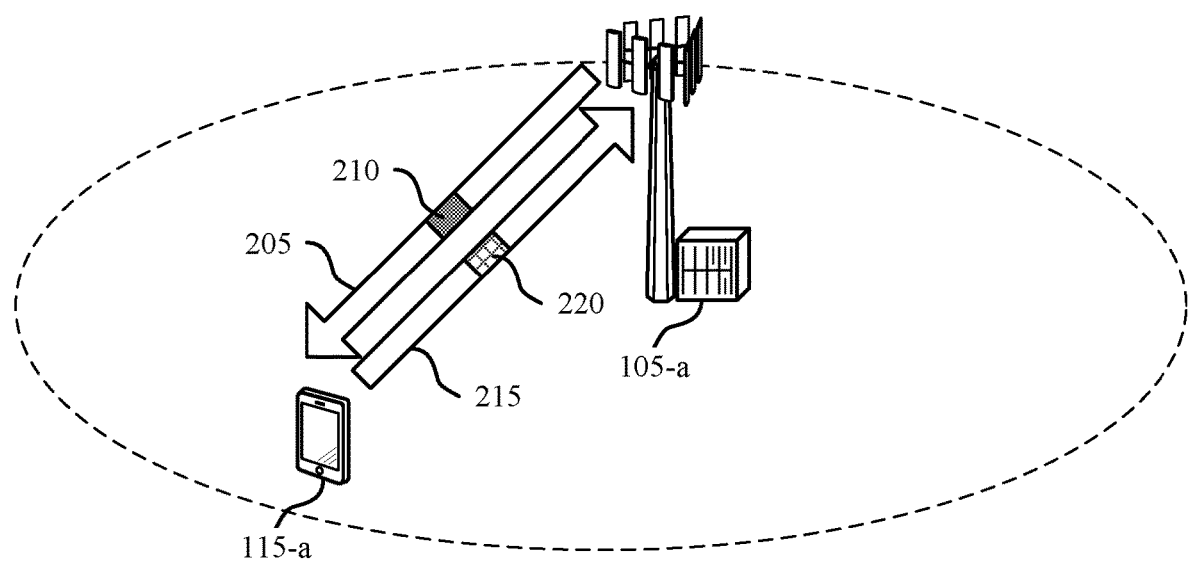
FIG. 2 illustrates an example of a wireless communications system that supports channel state information computation using a control resource assumption in accordance with aspects of the present disclosure.

FIG. 2 illustrates an example of a wireless communications system 200 that supports control overhead assumption for channel quality indicator computation in accordance with various aspects of the present disclosure. In some examples, wireless communications system 200 may implement aspects of wireless communications system 100. Wireless communications system 200 may include UE 115-*a* and base station 105-*a*, which may be respective examples of a UE 115 and a base station 105 as described with reference to FIG. 1.

Base station 105-*a* may transmit downlink data 210 over a downlink channel 205 to UE 115-*a*. UE 115-*a* may calculate CSI for the downlink data 210 and transmit a CSI report 220 on an uplink channel 215. The CSI report 220 may include a CQI index, which may indicate the quality of downlink channels. UE 115-*a* may compute the CQI index based on a number of resource elements configured for data transmission in the reference resource. UE 115-*a* may assume that a number of resource elements of the reference resource are configured for control information and disregard the resource elements assumed to be control information when determining CSI.

Due to control overhead varying between wireless communication systems, UE 115-*a* may adjust control overhead assumptions for determining CSI. In some examples, UE 115-*a* and base station 105-*a* may support narrowband communications, utilizing multiple sub-bands and up to two RB sets of configurable size for transmitting sPDCCH. For example, UE 115-*a* and base station 105-*a* may use sub-bands which may not include RB sets and therefore do not have a control overhead. In some examples, RB sets configured for UE 115-*a* may not be a maximum size, and thus UE 115-*a* may have less control overhead than what may be assumed under other wireless communications systems.

To more accurately determine CSI, UE 115-*a* may adjust control overhead assumptions for different CSI reporting schemes. In some examples, UE 115-*a* may assume that configured RB sets are assigned exclusively for sPDCCH transmissions (e.g., control information). Thus, the RB sets as configured by RRC signaling may be assumed to be the control overhead. In other words, for CSI computation, the number of RB sets and their sizes may be identical to those configured by base station 105-*a* (e.g., via RRC messaging). Additionally, the assumption may change over time as a control configuration associated with the RB set(s) changes over time. Such techniques utilizing the configured RB sets for the computation of CSI may enable efficient CSI reporting for multiple different CSI reporting schemes (e.g., wideband CSI reporting and sub-band CSI reporting schemes).

CSI reporting for low latency or narrowband communications may occur more frequently than configuration changes by RRC signaling. For example, CSI reporting may be performed on an sTTI time-scale (e.g., a time scale of a two-symbol TTI, a three-symbol TTI, a seven-symbol TTI, a mini slot, and the like). Thus, the RB set configurations indicated in RRC signaling may be considered constant relative to the CSI reporting. In some cases, the RB set configuration may be specific to UE 115-*a*, and other UEs 115 (not shown) may have different RB set configurations. When UE 115-*a* reports wideband CSI, it may be assumed that the RB set resources are configured for control information and may not be available for data transmission. For each sub-band, any portion of the sub-band overlapping with any of the RB sets may be considered unavailable for data transmission. In some examples, assuming control overhead based on RB set configurations indicated in RRC signaling may be appropriate for wideband CSI reporting and sub-band CSI reporting.

Alternatively, UE 115-*a* may assume that there is no control overhead. For example, UE 115-*a* may assume that each RB set may be contained within a single RB set. In some examples, each sub-band may be scheduled by an RB set outside of the sub-band. In some examples, assuming no control overhead may be appropriate for sub-band-based CSI reporting. In some other examples, UE 115-*a* may make a worst-case assumption for control overhead. For example, UE 115-*a* may assume that used sub-bands include two RB sets of maximum size.

Figure 3:
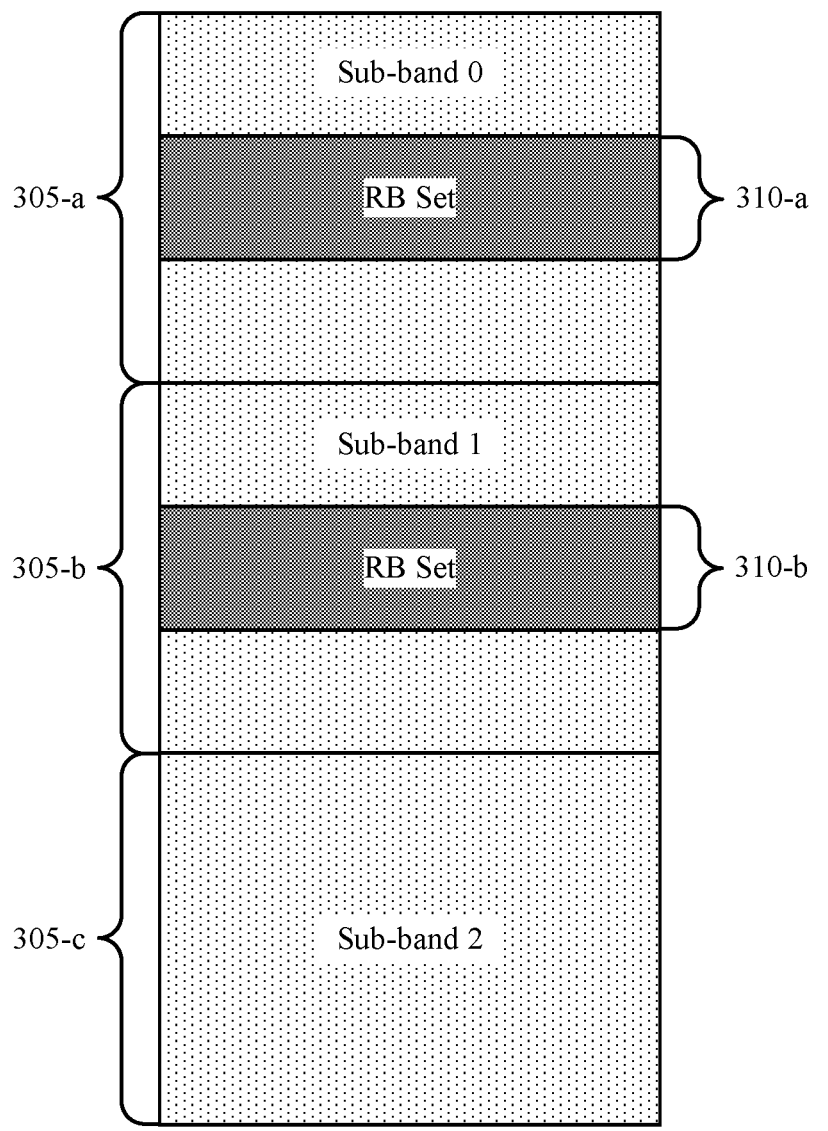
FIG. 3 illustrates an example of a radio frequency (RF) sub-band configuration in a system that supports channel state information computation using a control resource assumption in accordance with aspects of the present disclosure.

FIG. 3 illustrates an example of an RF sub-band configuration 300 that supports control overhead assumption for channel quality indicator computation in accordance with various aspects of the present disclosure. In some examples, RF sub-band configuration 300 may implement aspects of wireless communications system 100. RF sub-band configuration 300 may be an exemplary configuration of RF sub-bands allocated to a UE 115 as described herein. The UE 115 may report CSI to a serving base station 105 for data transmitted on the RF sub-bands.

A UE 115 may be allocated a number of sub-bands 305 for communication with a base station 105. For example, the UE 115 may be allocated sub-band 305-*a*, sub-band 305-*b*, and sub-band 305-*c*. In other cases, the UE 115 may not be scheduled over an entire sub-band 305 or all sub-bands 305. The sub-bands 305 may be used for CSI computation, and may not be the same sub-bands included in a resource allocation (e.g., downlink resources) for the UE 115. Accordingly, the UE 115 may obtain channel information for different sub-bands 305 of a total system bandwidth, such as in sub-band CSI reporting schemes. Accordingly, the sub-bands 305 may be contiguous in frequency or separated. In some examples, the base station 105 may configure a number of RB sets 310 (e.g., up to two RB sets 310) for the UE 115. For example, the base station 105 may configure RB set 310-*a* in sub-band 305-*a* and RB set 310-*b* in sub-band 305-*b*. In some examples, the base station 105 may configure the RB sets 310 by RRC signaling.

The UE 115 may use different assumptions for control overhead when computing CQI and reporting CSI to the base station 105. For example, the UE 115 may assume that the RB sets 310, as configured by the base station 105, are used for control information such as sPDCCH. Due to being configured by RRC signaling, the configuration of RB sets 310 may vary at a relatively slow rate (e.g., as compared to CSI reporting) and may be considered constant for narrowband or low latency communications. Thus, when the UE 115 reports CSI to the base station 105, it may be assumed that resources for a RB set 310 are not available for data transmission.

For example, the UE 115 may assume that sub-band 305-c includes no control overhead, as the UE 115 is not configured an RB set 310 in sub-band 305-c. However, the portion of sub-band 305-b that overlaps with RB set 310-b and the portion of sub-band 305-a that overlaps with RB set 310-a may be assumed as resources used for control information. Thus, the UE 115 may not consider the portions of sub-band 310-a (or sub-band 310-b) overlapping with an RB set 310 when computing CQI and reporting CSI to the base station 105.

In some examples, an RB set 310 (e.g., RB set 310-a or RB set 310-b, or both), may include sPDCCH, which may include resource grants for the UE, such as uplink grants, downlink grants, or both. The UE 115 may rate match around the sPDCCH and assume the remaining portion of the RB set is available for data transmission. In some examples, the UE 115 may rate match around sPDCCH in a first RB set 310, but also rate match around a second RB set 310 if the second RB set 310 is available for data transmission. For example, if the UE 115 detects sPDCCH in sub-band 310-a, the UE 115 may rate match sub-band 310-b and assume sub-band 310-b is available for data transmission.

In some other examples, the UE 115 may assume there is no control overhead. For example, the UE 115 may assume that each RB set 310 may be contained in one RB set 310. For example, sub-band 305-c may be scheduled by RB set 310-a or RB set 310-b such that there is no control information in sub-band 305-c. Sub-band 305-b may be scheduled from RB set 310-a in a similar manner. Thus, both sub-band 305-b and sub-band 305-c may not have control overhead, and the control information may be contained in sub-band 305-a, specifically RB set 310-a. In some cases, by assuming no control overhead, the UE 115 may perform RAN tests (e.g., RAN4 tests), as each sub-band may be scheduled by an sPDCCH outside of the sub-band. In some examples, the tests may assist the UE 115 with checking the accuracy of an assumption-based CSI report.

A CQI index may be calculated based on the modulation and coding scheme (MCS) and transport block size that can be used to transmit over the reference resource. Each CQI index may have an associated MCS. The UE 115 may test different combinations of MCS and transport block size and select the highest CQI index which has a low block error ratio (e.g., under 10%). To determine which transport block size may be used to transmit over the reference resource, the UE 115 may make assumptions for how many resources of the reference resource are used for control information and not for data.

In some cases, the UE 115 may select an MCS using a table containing thresholds of mutual information or spectral efficiency. The UE 115 may compute the mutual information and spectral efficiency over the CSI reference resource and pick the largest MCS with a threshold less than or equal to the computed mutual information and spectral efficiency. By assuming the control overhead as described, the UE 115 may remove those resources from the mutual information calculation. Thus, the UE may calculate the SNR per resource element, i, as $SNR_i$. The total mutual information may be calculated as $\sum_{i \in RR}$ Mutual Information($SNR_i$), where RR is the reference resource.

Figure 4:
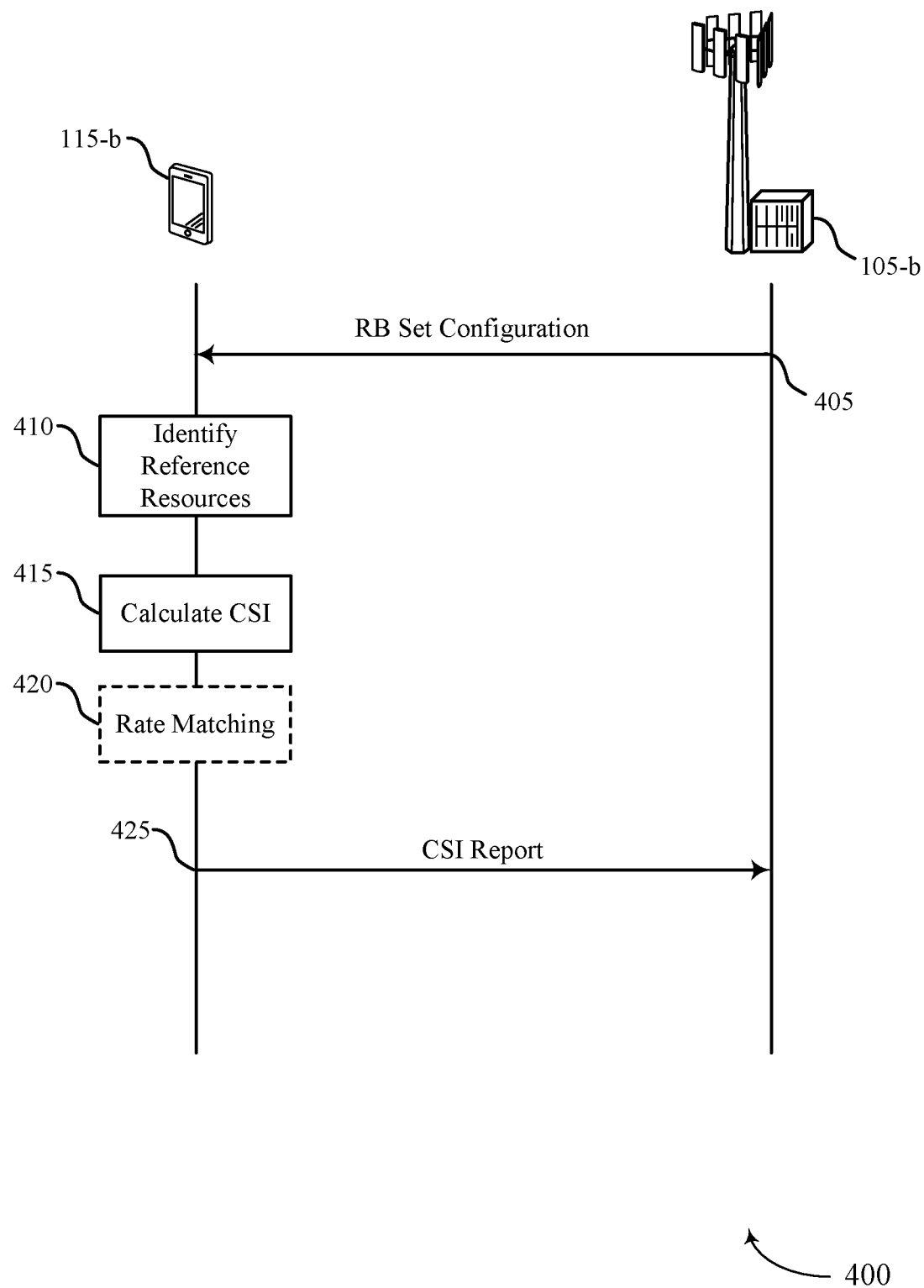
FIG. 4 illustrates an example of a process flow in a system that supports channel state information computation using a control resource assumption in accordance with aspects of the present disclosure.

FIG. 4 illustrates an example of a process flow 400 that supports control overhead assumption for channel quality indicator computation in accordance with various aspects of the present disclosure. In some examples, process flow 400 may implement aspects of wireless communications system 100. As illustrated, UE 115-b may report CSI for data transmissions from base station 105-b. UE 115-b and base station 105-b may be respective examples of a UE 115 and base station 105 as described with reference to FIGS. 1-2.

At 405, base station 105-b may transmit an indication of an RB set configuration to UE 115-b. In some examples, the RB set configuration may be specific to UE 115-b and associated with one or more RB sets including control resources for UE 115-b within one or more RF bands. In some examples, UE 115-b may receive the RB set configuration via RRC messaging. In some cases, the one or more RF bands may include a wideband RF band or RF sub-bands. UE 115-b may, in some cases, identify a CSI reference resource for calculating CSI at 410.

At 415, UE 115-b may calculate CSI. In some examples, UE 115-b may calculate CSI based on the RB set configuration. UE 115-b may calculate the CSI based on a number of the one or more RB sets and a size of the one or more RB sets, where the number of the one or more RB sets and the size of the one or more RB sets are in accordance with the RB set configuration. In some other examples, UE 115-b may calculate the CSI based on an assumption that each of the one or more RB sets are assigned to an sPDCCH. In some cases, UE 115-b may calculate the CSI based on an assumption that each of the one or more RB sets are unavailable for data transmission, where the CSI report may be based on a wideband CSI reporting scheme.

In some cases, UE 115-b may determine that a portion of a sub-band of the one or more RF bands is overlapping with the one or more RB sets based on the RB set configuration, and UE 115-b may calculate the CSI based on an assumption that the portion of the sub-band is unavailable for data transmission, where the CSI report may be based on a sub-band CSI reporting scheme.

In some cases, UE 115-b may calculate a CQI for the identified CSI reference resources. UE 115-b may calculate the CQI for the CSI reference resources based on an assumption that the control resources of the one or more RB sets are control overhead, the control resources of the one or more RB sets being removed from the CSI reference resources for calculating CQI.

In some other examples, UE 115-b may assume there is no control overhead within the CSI reference resource. UE 115-b may identify CSI reference resources for each RF sub-band of a set of RF sub-bands at 410. Then, at 415, UE 115-b may calculate CSI for each RF sub-band based on the assumption that there is no control overhead within the CSI reference resources. In some cases, UE 115-b may calculate CSI for the first RF sub-band based on an assumption that a second RB set located within the first RF sub-band is available for data transmissions. In some examples, a first RF sub-band of the set of RF sub-bands may be scheduled by a first RB in accordance with the RF set configuration, the first RB set being located outside of the first RF sub-band.

In some examples, UE 115-b may rate match around portions of the RB sets. For example, UE 115-b may perform rate matching around a first portion of the one or more RB sets that include an SPDCCH based on an assumption that a second portion of the one or more RB sets is available for data transmission. Additionally, or alternatively, UE 115-b may perform rate matching around a first portion of a first RB set that includes an sPDCCH based on an assumption that a second portion of the first RB set is available for data transmission, the first portion being different from the second portion, then perform rate matching around a second RB set. In some cases, the sPDCCH may include an uplink resource grant, a downlink resource grant, or a combination thereof.

At 425, UE 115-*b* may transmit a CSI report including the calculated CSI to base station 105-*b*. In some examples, UE 115-*b* may transmit the CSI report during a TTI that has a duration that is less than that of a second TTI, where the first TTI includes an sTTI. That is, the CSI reporting may, in some cases, be performed on an sTTI time-scale (e.g., a time scale of a two-symbol TTI, a three-symbol TTI, a seven-symbol TTI, a mini slot, and the like). If UE 115-*b* calculated CQI, UE 115-*b* may transmit the calculated CQI as part of the CSI report.

Figure 5:
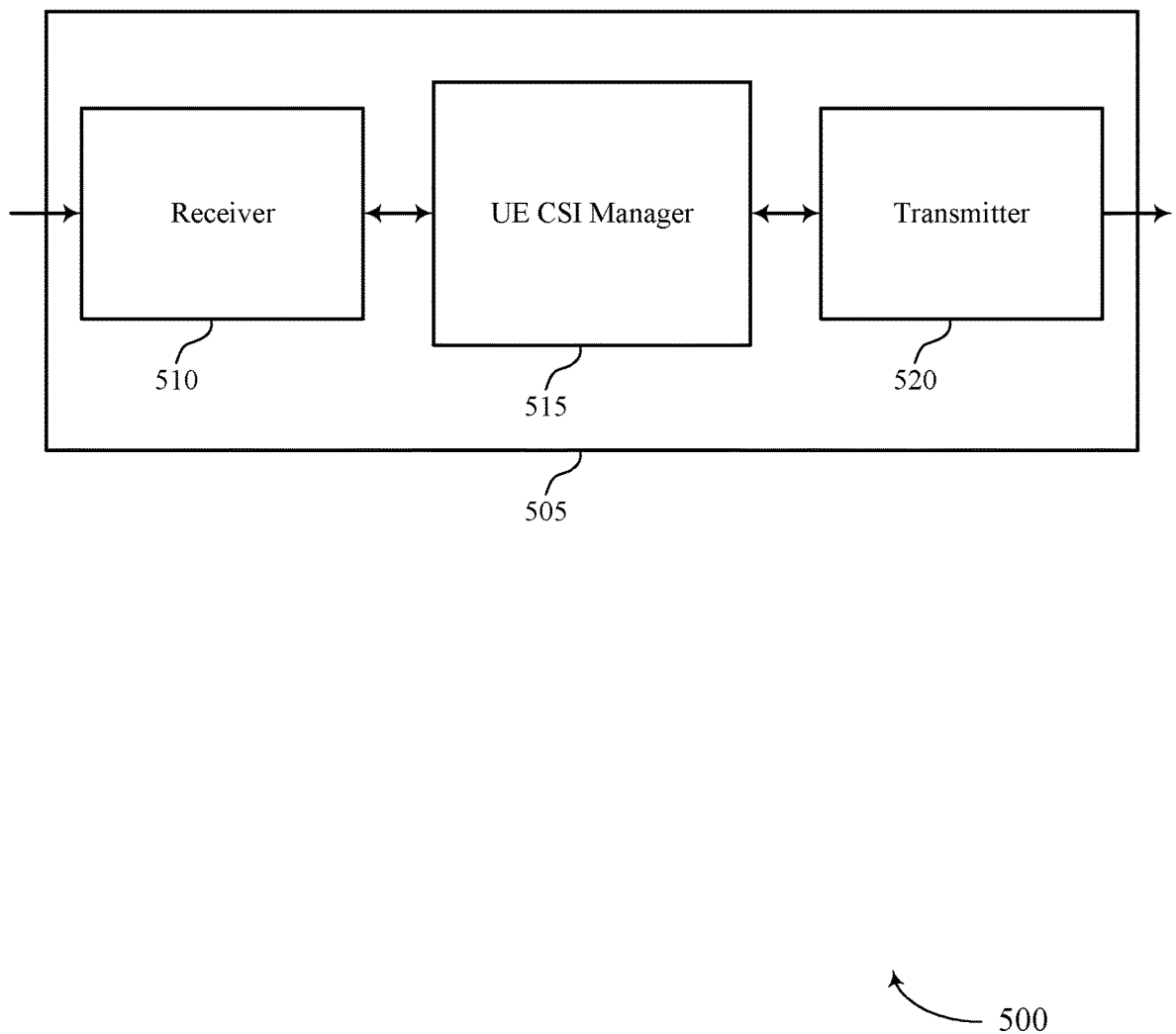
FIGS. 5 through 7 show block diagrams of a device that supports channel state information computation using a control resource assumption in accordance with aspects of the present disclosure.

FIG. 5 shows a block diagram 500 of a wireless device 505 that supports channel state information computation using a control resource assumption in accordance with aspects of the present disclosure. Wireless device 505 may be an example of aspects of a user equipment (UE) 115 as described herein. Wireless device 505 may include receiver 510, UE channel state information (CSI) manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to channel state information computation using a control resource assumption, etc.). Information may be passed on to other components of the device. The receiver 510 may be an example of aspects of the transceiver 835 described with reference to FIG. 8. The receiver 510 may utilize a single antenna or a set of antennas.

UE CSI manager 515 may be an example of aspects of the UE CSI manager 815 described with reference to FIG. 8. UE CSI manager 515 and/or at least some of its various sub-components may be implemented in hardware, software executed by a processor, firmware, or any combination thereof. If implemented in software executed by a processor, the functions of the UE CSI manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE CSI manager 515 and/or at least some of its various sub-components may be physically located at various positions, including being distributed such that portions of functions are implemented at different physical locations by one or more physical devices. In some examples, UE CSI manager 515 and/or at least some of its various sub-components may be a separate and distinct component in accordance with various aspects of the present disclosure. In other examples, UE CSI manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE CSI manager 515 may receive, from a base station, an indication of a UE-specific RB set configuration, the RB set configuration associated with one or more RB sets including control resources for the UE within one or more radio frequency (RF) bands. UE CSI manager 515 may calculate CSI based on the RB set configuration, and transmit a CSI report including the calculated CSI to the base station. The UE CSI manager 515 may also identify a set of CSI reference resources for each RF sub-band of a set of RF sub-bands, calculate CSI for each RF sub-band based on an assumption that there is no control overhead within the CSI reference resources. Accordingly, UE CSI manager 515 may then transmit a CSI report including the calculated CSI to the base station.

Transmitter 520 may transmit signals generated by other components of the device. In some examples, the transmitter 520 may be collocated with a receiver 510 in a transceiver. For example, the transmitter 520 may be an example of aspects of the transceiver 835 described with reference to FIG. 8. The transmitter 520 may utilize a single antenna or a set of antennas.

Figure 6:
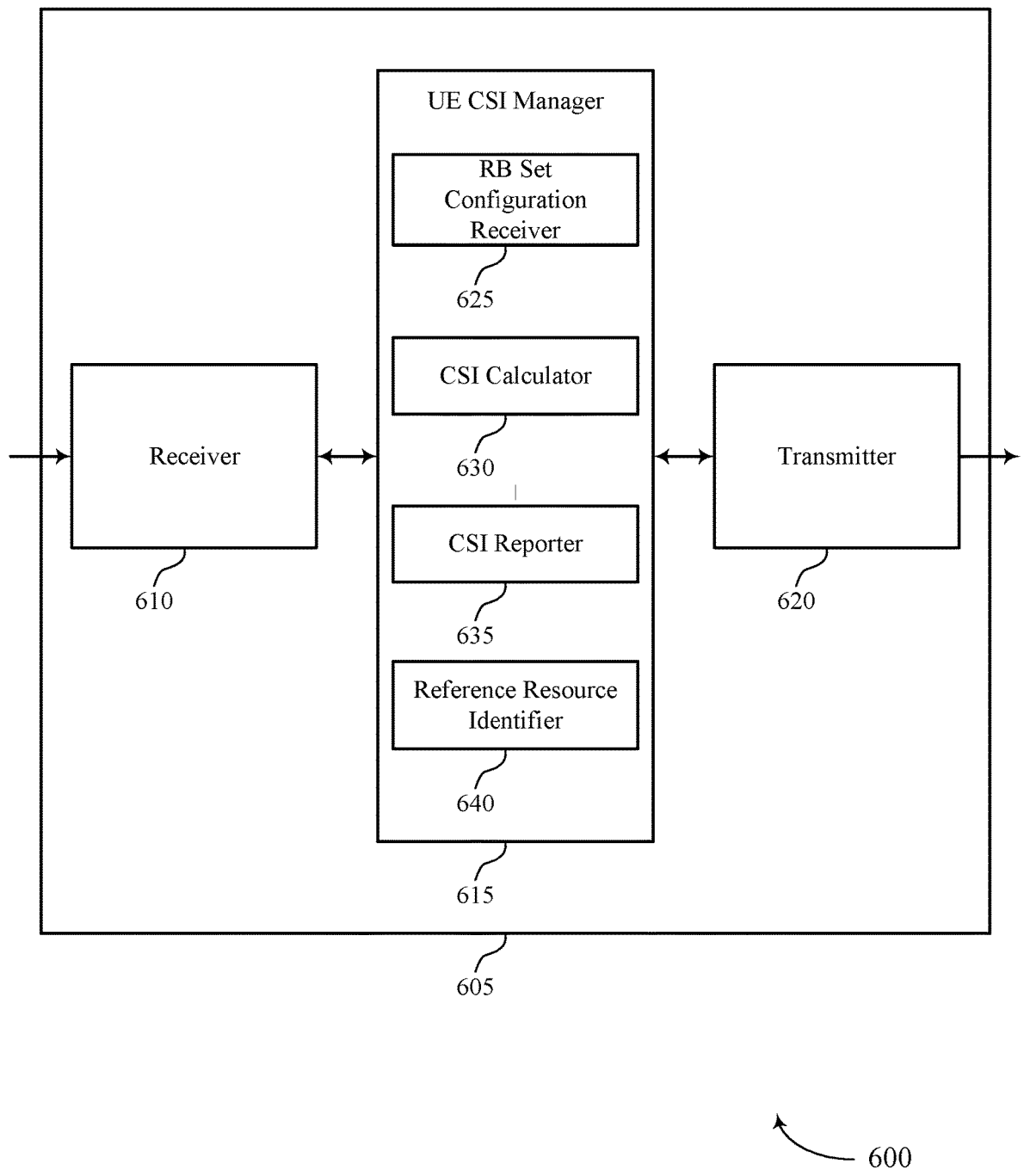

FIG. 6 shows a block diagram 600 of a wireless device 605 that supports channel state information computation using a control resource assumption in accordance with aspects of the present disclosure. Wireless device 605 may be an example of aspects of a wireless device 505 or a UE 115 as described with reference to FIG. 5. Wireless device 605 may include receiver 610, UE CSI manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to channel state information computation using a control resource assumption, etc.). Information may be passed on to other components of the device. The receiver 610 may be an example of aspects of the transceiver 835 described with reference to FIG. 8. The receiver 610 may utilize a single antenna or a set of antennas.

UE CSI manager 615 may be an example of aspects of the UE CSI manager 815 described with reference to FIG. 8. UE CSI manager 615 may also include RB set configuration receiver 625, CSI calculator 630, CSI reporter 635, and reference resource identifier 640.

RB set configuration receiver 625 may receive, from a base station, an indication of a UE-specific RB set configuration, the RB set configuration associated with one or more RB sets including control resources for the UE within one or more RF bands. In some cases, RB set configuration receiver 625 may determine that a portion of a sub-band of the one or more RF bands is overlapping with the one or more RB sets based on the RB set configuration. In some examples, RB set configuration receiver 625 may receive the RB set configuration via RRC messaging. In some cases, the one or more RF bands include a wideband RF band or RF sub-bands. In some cases, a first RF sub-band of the set of RF sub-bands is scheduled by a first RB set in accordance with an RF set configuration, the first RB set being located outside of the first RF sub-band.

CSI calculator 630 may calculate CSI based on the RB set configuration, calculate the CSI based on a number of the one or more RB sets and a size of the one or more RB sets, where the number of the one or more RB sets and the size of the one or more RB sets are in accordance with the RB set configuration. In some cases, CSI calculator 630 may calculate the CSI based on an assumption that each of the one or more RB sets are assigned to an sPDCCH. In some examples, CSI calculator 630 may calculate the CSI based on an assumption that each of the one or more RB sets are unavailable for data transmissions, where the CSI report is based on a wideband CSI reporting scheme. Additionally or alternatively, CSI calculator 630 may calculate the CSI based on an assumption that the portion of the sub-band is unavailable for data transmissions, where the CSI report is based on a sub-band CSI reporting scheme.

In some examples, CSI calculator 630 may calculate a CQI for the CSI reference resources based on an assumption that the control resources of the one or more RB sets are control overhead, the control resources of the one or more RB sets being removed from the CSI reference resources for calculating CQI. In some cases, CSI calculator 630 may calculate CSI for each RF sub-band based on an assumption that there is no control overhead within the CSI reference resources. Additionally or alternatively, CSI calculator 630 may calculate CSI for the first RF sub-band based on an assumption that a second RB set located within the second RF sub-band is available for data transmissions. CSI calculator 630 may also calculate CSI for the first RF sub-band based on an assumption that the first RF sub-band excludes a second RF set.

CSI reporter 635 may transmit a CSI report including the calculated CSI to the base station, transmit the calculated CQI as part of the CSI report, and transmit the CSI report during a TTI that has a duration that is less than that of a second TTI, where the first TTI includes an sTTI. Reference resource identifier 640 may identify a set of CSI reference resources to be used for calculating CSI and identify a set of CSI reference resources for each RF sub-band of a set of RF sub-bands.

Transmitter 620 may transmit signals generated by other components of the device. In some examples, the transmitter 620 may be collocated with a receiver 610 in a transceiver. For example, the transmitter 620 may be an example of aspects of the transceiver 835 described with reference to FIG. 8. The transmitter 620 may utilize a single antenna or a set of antennas.

Figure 7:
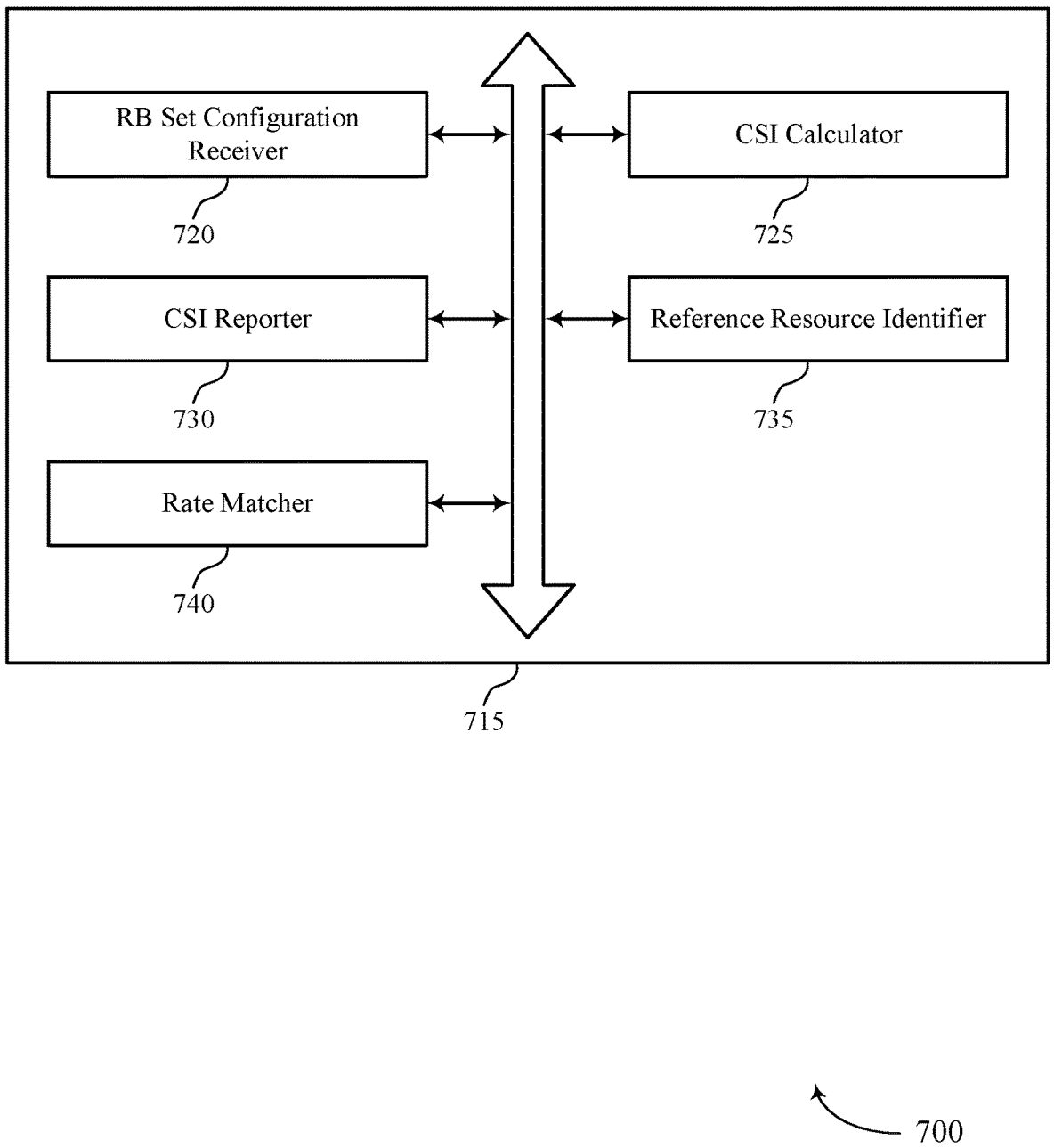

FIG. 7 shows a block diagram 700 of a UE CSI manager 715 that supports channel state information computation using a control resource assumption in accordance with aspects of the present disclosure. The UE CSI manager 715 may be an example of aspects of a UE CSI manager 515, a UE CSI manager 615, or a UE CSI manager 815 described with reference to FIGS. 5, 6, and 8. The UE CSI manager 715 may include RB set configuration receiver 720, CSI calculator 725, CSI reporter 730, reference resource identifier 735, and rate matcher 740. Each of these may communicate, directly or indirectly, with one another (e.g., via one or more buses).

RB set configuration receiver 720 may receive, from a base station, an indication of a UE-specific RB set configuration, the RB set configuration associated with one or more RB sets including control resources for the UE within one or more RF bands, determine that a portion of a sub-band of the one or more RF bands is overlapping with the one or more RB sets based on the RB set configuration, and receive the RB set configuration via RRC messaging. In some cases, the one or more RF bands include a wideband RF band or RF sub-bands. In some cases, a first RF sub-band of the set of RF sub-bands is scheduled by a first RB set in accordance with an RF set configuration, the first RB set being located outside of the first RF sub-band.

CSI calculator 725 may calculate CSI based on the RB set configuration, calculate the CSI based on a number of the one or more RB sets and a size of the one or more RB sets, where the number of the one or more RB sets and the size of the one or more RB sets are in accordance with the RB set configuration. In some cases, CSI calculator 725 may calculate the CSI based on an assumption that each of the one or more RB sets are assigned to an sPDCCH. In some examples, CSI calculator 725 may calculate the CSI based on an assumption that each of the one or more RB sets are unavailable for data transmissions, where the CSI report is based on a wideband CSI reporting scheme. Additionally or alternatively, CSI calculator 725 may calculate the CSI based on an assumption that the portion of the sub-band is unavailable for data transmissions, where the CSI report is based on a sub-band CSI reporting scheme.

In some examples, CSI calculator 725 may calculate a CQI for the CSI reference resources based on an assumption that the control resources of the one or more RB sets are control overhead, the control resources of the one or more RB sets being removed from the CSI reference resources for calculating CQI. In some cases, CSI calculator 725 may calculate CSI for each RF sub-band based on an assumption that there is no control overhead within the CSI reference resources. Additionally or alternatively, CSI calculator 725 may calculate CSI for the first RF sub-band based on an assumption that a second RB set located within the second RF sub-band is available for data transmissions. CSI calculator 725 may also calculate CSI for the first RF sub-band based on an assumption that the first RF sub-band excludes a second RF set.

CSI reporter 730 may transmit a CSI report including the calculated CSI to the base station, transmit the calculated CQI as part of the CSI report, and transmit the CSI report during a first TTI that has a duration that is less than that of a second TTI, where the first TTI includes a sTTI. Reference resource identifier 735 may identify a set of CSI reference resources to be used for calculating CSI and identify a set of CSI reference resources for each RF sub-band of a set of RF sub-bands.

Rate matcher 740 may perform rate matching around a first portion of the one or more RB sets that includes an sPDCCH based on an assumption that a second portion of the one or more RB sets is available for data transmissions, the first portion being different from the second portion. In some cases, rate matcher 740 may perform rate matching around a first portion of a first RB set that includes an sPDCCH based on an assumption that a second portion of the first RB sets is available for data transmissions, the first portion being different from the second portion. Additionally or alternatively, rate matcher 740 may perform rate matching around a second RB set. In some cases, the sPDCCH includes an uplink resource grant, or a downlink resource grant, or a combination thereof. In some cases, the sPDCCH includes an uplink resource grant, or a downlink resource grant, or a combination thereof.

Figure 8:
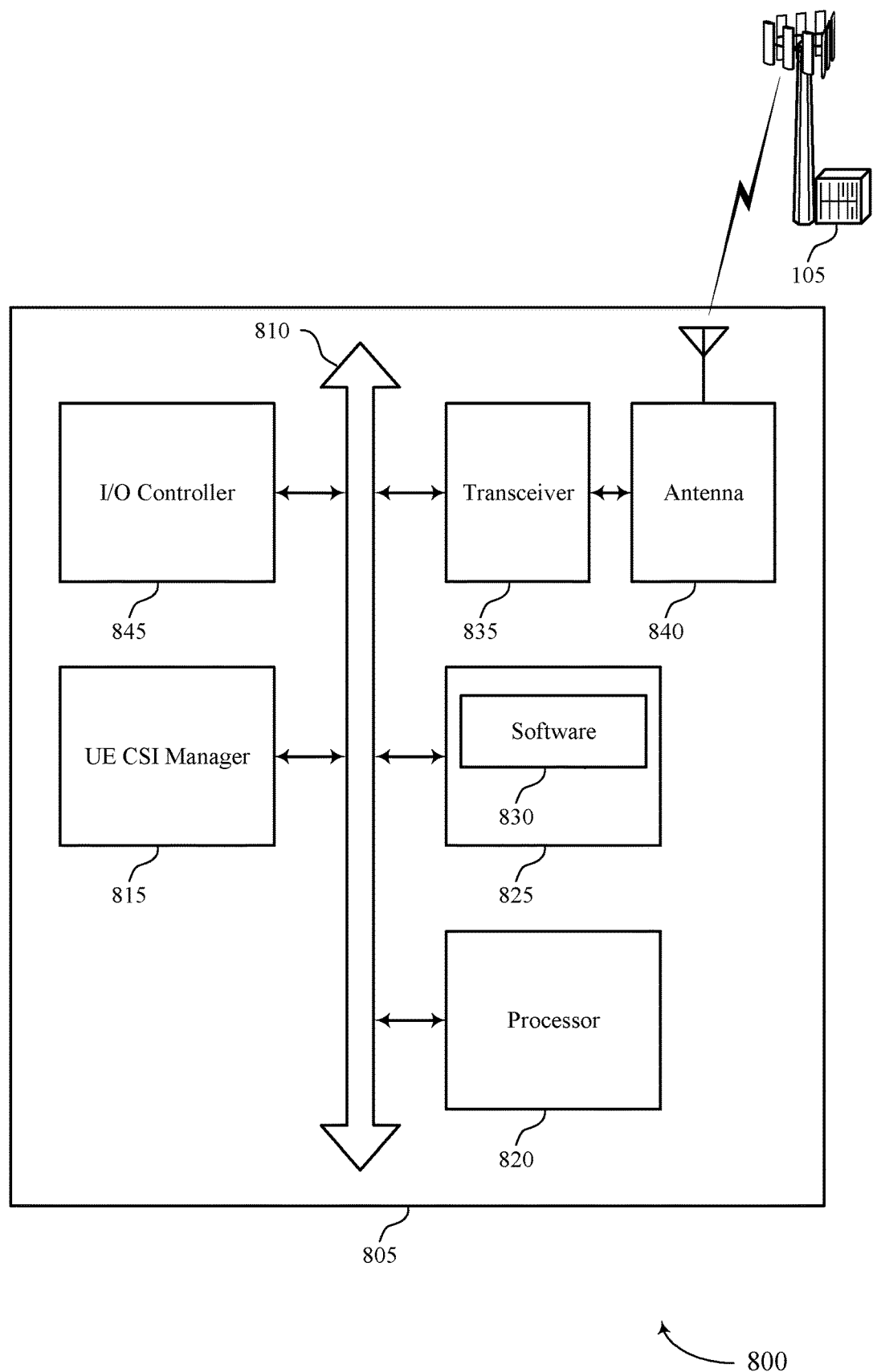
FIG. 8 illustrates a block diagram of a system including a user equipment (UE) that supports channel state information computation using a control resource assumption in accordance with aspects of the present disclosure.

FIG. 8 shows a diagram of a system 800 including a device 805 that supports channel state information computation using a control resource assumption in accordance with aspects of the present disclosure. Device 805 may be an example of or include the components of wireless device 505, wireless device 605, or a UE 115 as described above, e.g., with reference to FIGS. 5 and 6. Device 805 may include components for bi-directional voice and data communications including components for transmitting and receiving communications, including UE CSI manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting channel state information computation using a control resource assumption).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support channel state information computation using a control resource assumption. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
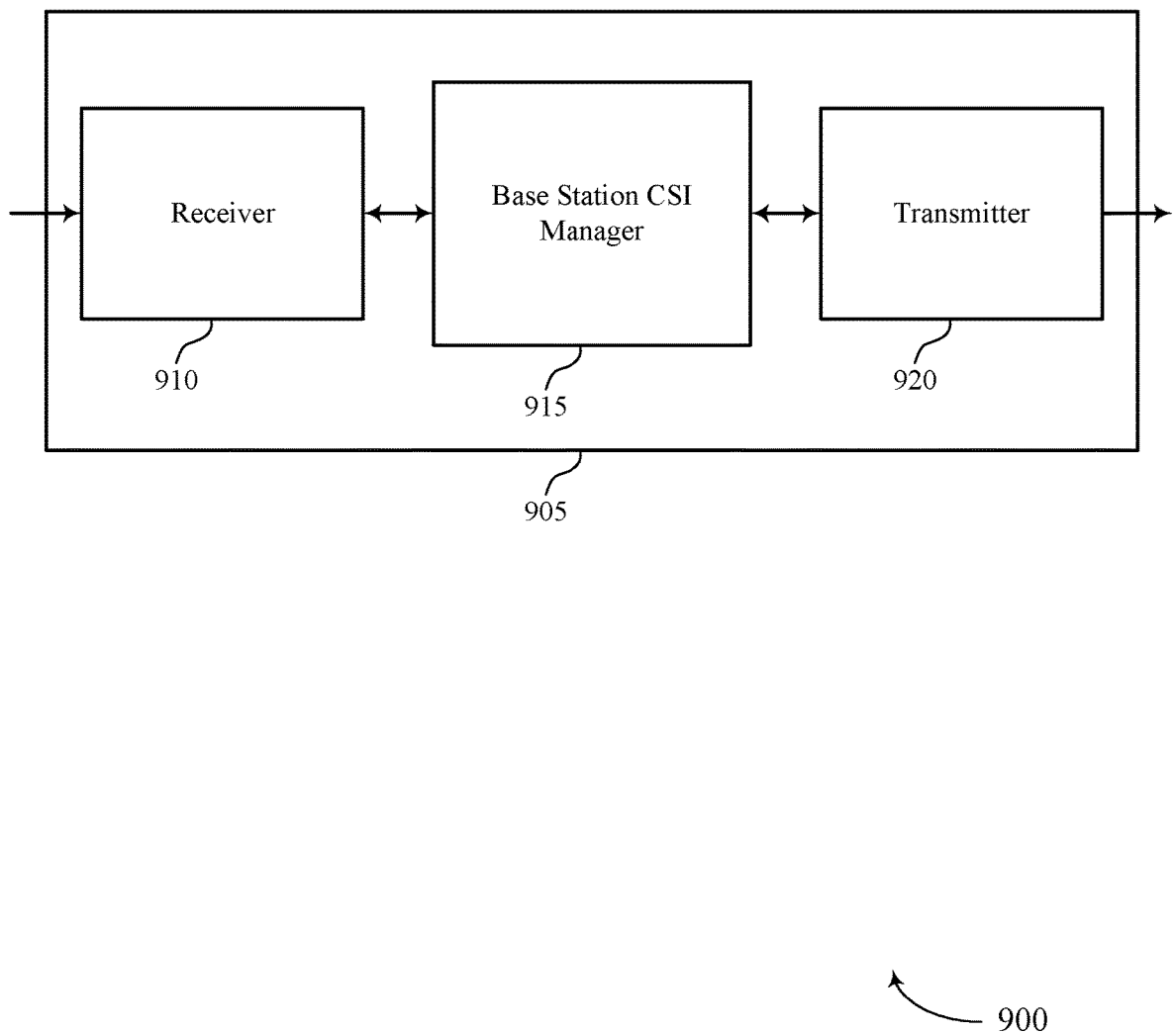
FIGS. 9 through 11 show block diagrams of a device that supports channel state information computation using a control resource assumption in accordance with aspects of the present disclosure.

FIG. 9 shows a block diagram 900 of a wireless device 905 that supports channel state information computation using a control resource assumption in accordance with aspects of the present disclosure. Wireless device 905 may be an example of aspects of a base station 105 as described herein. Wireless device 905 may include receiver 910, base station CSI manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to channel state information computation using a control resource assumption, etc.). Information may be passed on to other components of the device. The receiver 910 may be an example of aspects of the transceiver 1235 described with reference to FIG. 12. The receiver 910 may utilize a single antenna or a set of antennas.

Base station CSI manager 915 may be an example of aspects of the base station CSI manager 1215 described with reference to FIG. 12. Base station CSI manager 915 and/or at least some of its various sub-components may be implemented in hardware, software executed by a processor, firmware, or any combination thereof. If implemented in software executed by a processor, the functions of the base station CSI manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station CSI manager 915 and/or at least some of its various sub-components may be physically located at various positions, including being distributed such that portions of functions are implemented at different physical locations by one or more physical devices. In some examples, base station CSI manager 915 and/or at least some of its various sub-components may be a separate and distinct component in accordance with various aspects of the present disclosure. In other examples, base station CSI manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station CSI manager 915 may determine a UE-specific RB set configuration for a UE, the RB set configuration associated with one or more RB sets including control resources for the UE within one or more RF bands and transmit, to the UE, an indication of the RB set configuration for CSI calculation.

Transmitter 920 may transmit signals generated by other components of the device. In some examples, the transmitter 920 may be collocated with a receiver 910 in a transceiver. For example, the transmitter 920 may be an example of aspects of the transceiver 1235 described with reference to FIG. 12. The transmitter 920 may utilize a single antenna or a set of antennas.

Figure 10:
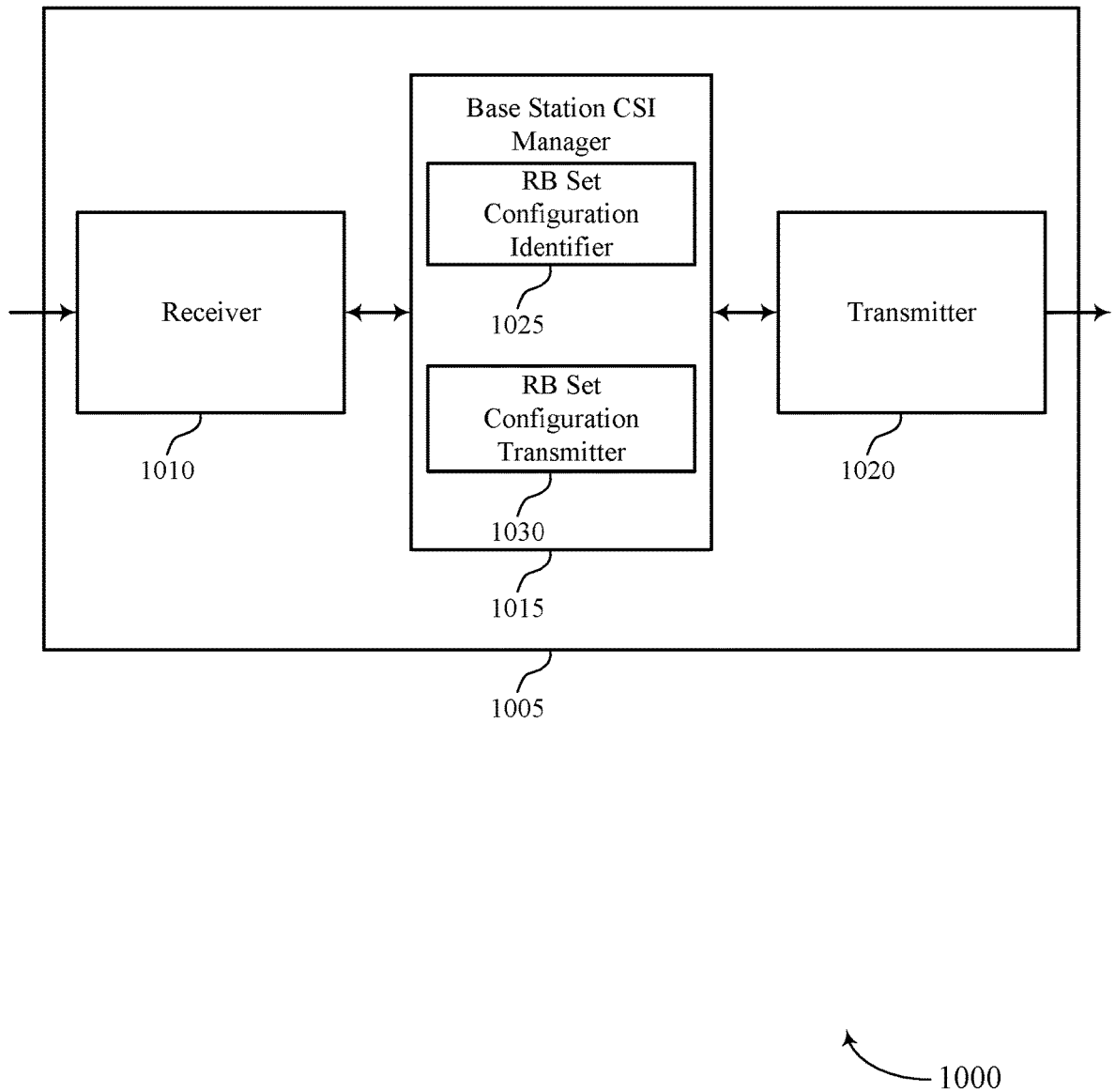

FIG. 10 shows a block diagram 1000 of a wireless device 1005 that supports channel state information computation using a control resource assumption in accordance with aspects of the present disclosure. Wireless device 1005 may be an example of aspects of a wireless device 905 or a base station 105 as described with reference to FIG. 9. Wireless device 1005 may include receiver 1010, base station CSI manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to channel state information computation using a control resource assumption, etc.). Information may be passed on to other components of the device. The receiver 1010 may be an example of aspects of the transceiver 1235 described with reference to FIG. 12. The receiver 1010 may utilize a single antenna or a set of antennas.

Base station CSI manager 1015 may be an example of aspects of the base station CSI manager 1215 described with reference to FIG. 12. Base station CSI manager 1015 may also include RB set configuration identifier 1025 and RB set configuration transmitter 1030.

RB set configuration identifier 1025 may determine a UE-specific RB set configuration for a UE, the RB set configuration associated with one or more RB sets including control resources for the UE within one or more RF bands. RB set configuration transmitter 1030 may transmit, to the UE, an indication of the RB set configuration for CSI calculation.

Transmitter 1020 may transmit signals generated by other components of the device. In some examples, the transmitter 1020 may be collocated with a receiver 1010 in a transceiver. For example, the transmitter 1020 may be an example of aspects of the transceiver 1235 described with reference to FIG. 12. The transmitter 1020 may utilize a single antenna or a set of antennas.

Figure 11:
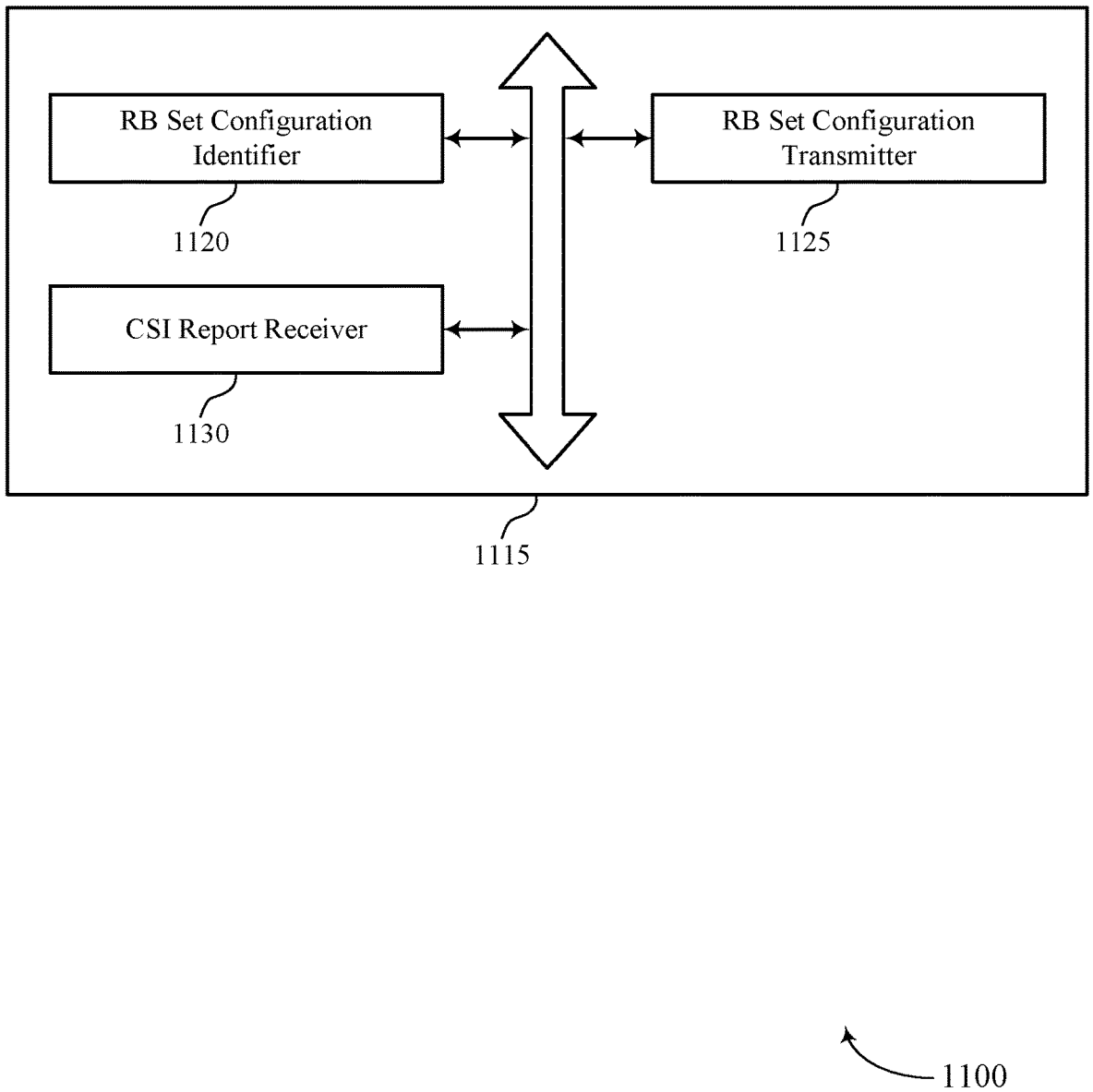

FIG. 11 shows a block diagram 1100 of a base station CSI manager 1115 that supports channel state information computation using a control resource assumption in accordance with aspects of the present disclosure. The base station CSI manager 1115 may be an example of aspects of a base station CSI manager 1215 described with reference to FIGS. 9, 10, and 12. The base station CSI manager 1115 may include RB set configuration identifier 1120, RB set configuration transmitter 1125, and CSI report receiver 1130. Each of these may communicate, directly or indirectly, with one another (e.g., via one or more buses).

RB set configuration identifier 1120 may determine a UE-specific RB set configuration for a UE, the RB set configuration associated with one or more RB sets including control resources for the UE within one or more RF bands. RB set configuration transmitter 1125 may transmit, to the UE, an indication of the RB set configuration for CSI calculation. CSI report receiver 1130 may receive a CSI report from the UE, the CSI report including CSI that is based on the RB set configuration and receive the CSI report during a TTI that has a duration that is less than that of another TTI.

Figure 12:
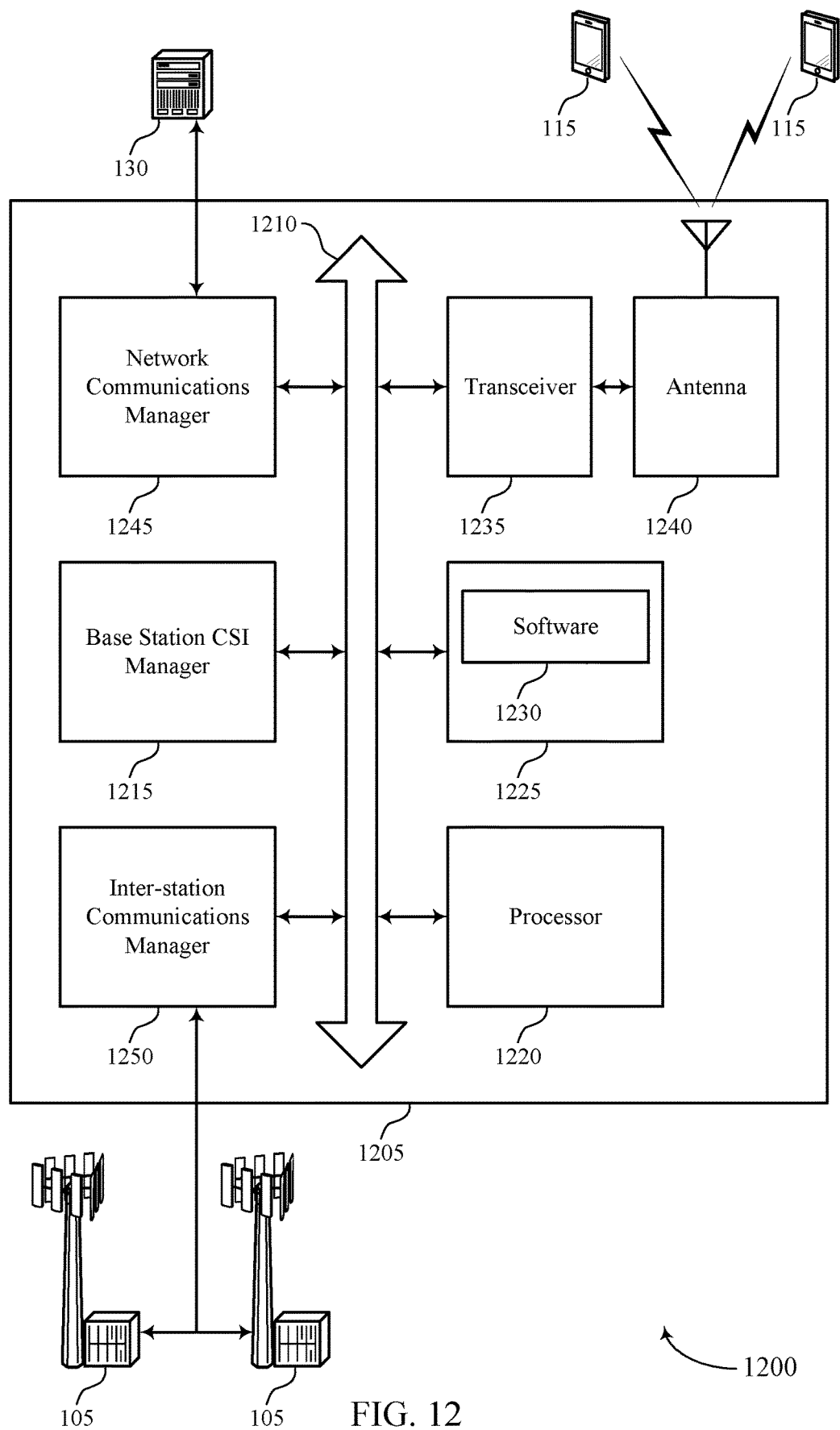
FIG. 12 illustrates a block diagram of a system including a base station that supports channel state information computation using a control resource assumption in accordance with aspects of the present disclosure.

FIG. 12 shows a diagram of a system 1200 including a device 1205 that supports channel state information computation using a control resource assumption in accordance with aspects of the present disclosure. Device 1205 may be an example of or include the components of base station 105 as described above, e.g., with reference to FIG. 1. Device 1205 may include components for bi-directional voice and data communications including components for transmitting and receiving communications, including base station CSI manager 1215, processor 1220, memory 1225, software 1230, transceiver 1235, antenna 1240, network communications manager 1245, and inter-station communications manager 1250. These components may be in electronic communication via one or more buses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting channel state information computation using a control resource assumption).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support channel state information computation using a control resource assumption. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas. In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Inter-station communications manager 1250 may manage communications with other base station 105, and may include a controller or scheduler for controlling communications with UEs 115 in cooperation with other base stations 105. For example, the inter-station communications manager 1250 may coordinate scheduling for transmissions to UEs 115 for various interference mitigation techniques such as beamforming or joint transmission. In some examples, inter-station communications manager 1250 may provide an x2 interface within an Long Term Evolution (LTE)/LTE-A wireless communication network technology to provide communication between base stations 105.

Figure 13:
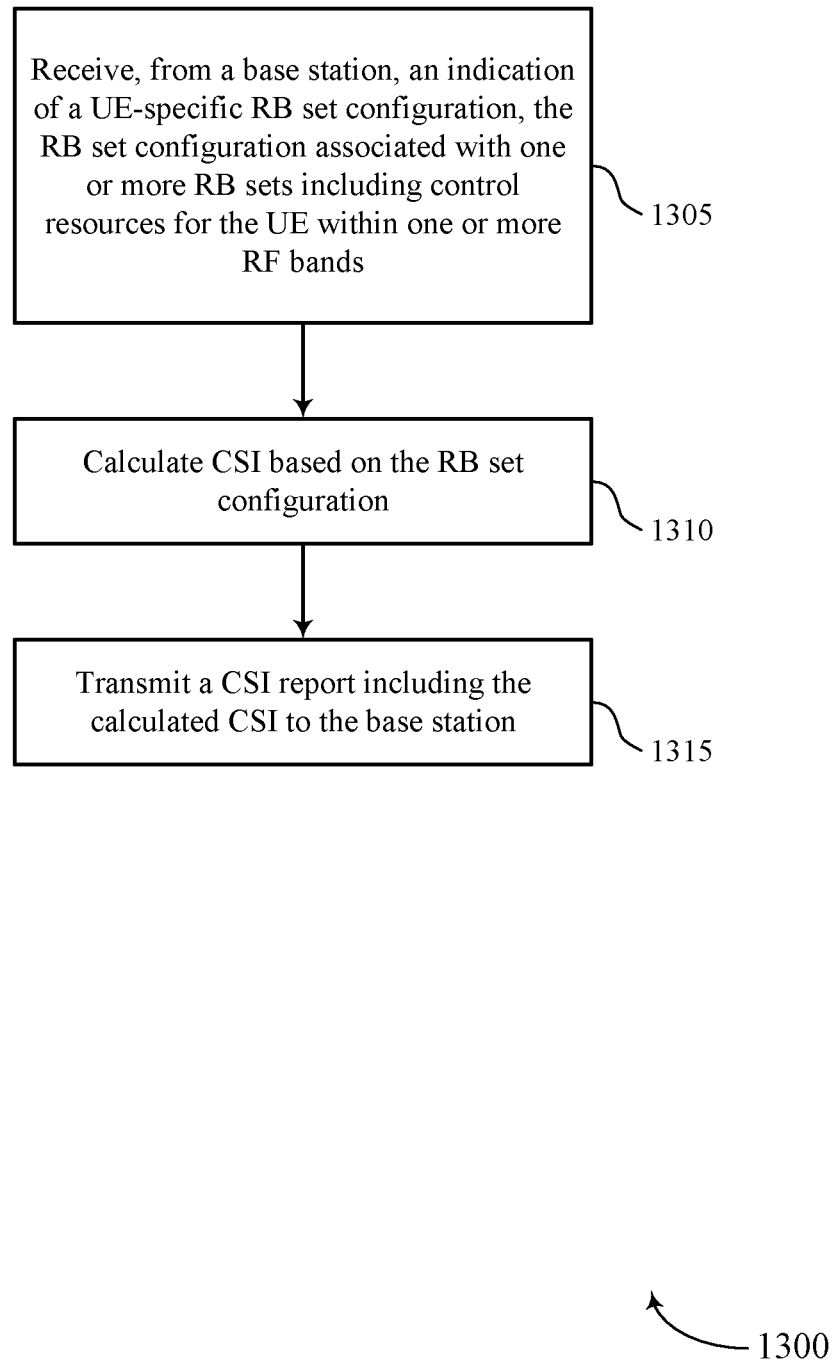
FIGS. 13 through 16 illustrate methods for channel state information computation using a control resource assumption in accordance with aspects of the present disclosure.

FIG. 13 shows a flowchart illustrating a method 1300 for channel state information computation using a control resource assumption in accordance with aspects of the present disclosure. The operations of method 1300 may be implemented by a UE 115 or its components as described herein. For example, the operations of method 1300 may be performed by a UE CSI manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1305 the UE 115 may receive, from a base station 105, an indication of a UE-specific RB set configuration, the RB set configuration associated with one or more RB sets comprising control resources for the UE 115 within one or more RF bands. The operations of 1305 may be performed according to the methods described herein. In certain examples, aspects of the operations of 1305 may be performed by a RB set configuration receiver as described with reference to FIGS. 5 through 8.

At 1310 the UE 115 may calculate CSI based at least in part on the RB set configuration. The operations of 1310 may be performed according to the methods described herein. In certain examples, aspects of the operations of 1310 may be performed by a CSI calculator as described with reference to FIGS. 5 through 8.

At 1315 the UE 115 may transmit a CSI report comprising the calculated CSI to the base station. The operations of 1315 may be performed according to the methods described herein. In certain examples, aspects of the operations of 1315 may be performed by a CSI reporter as described with reference to FIGS. 5 through 8.

Figure 14:
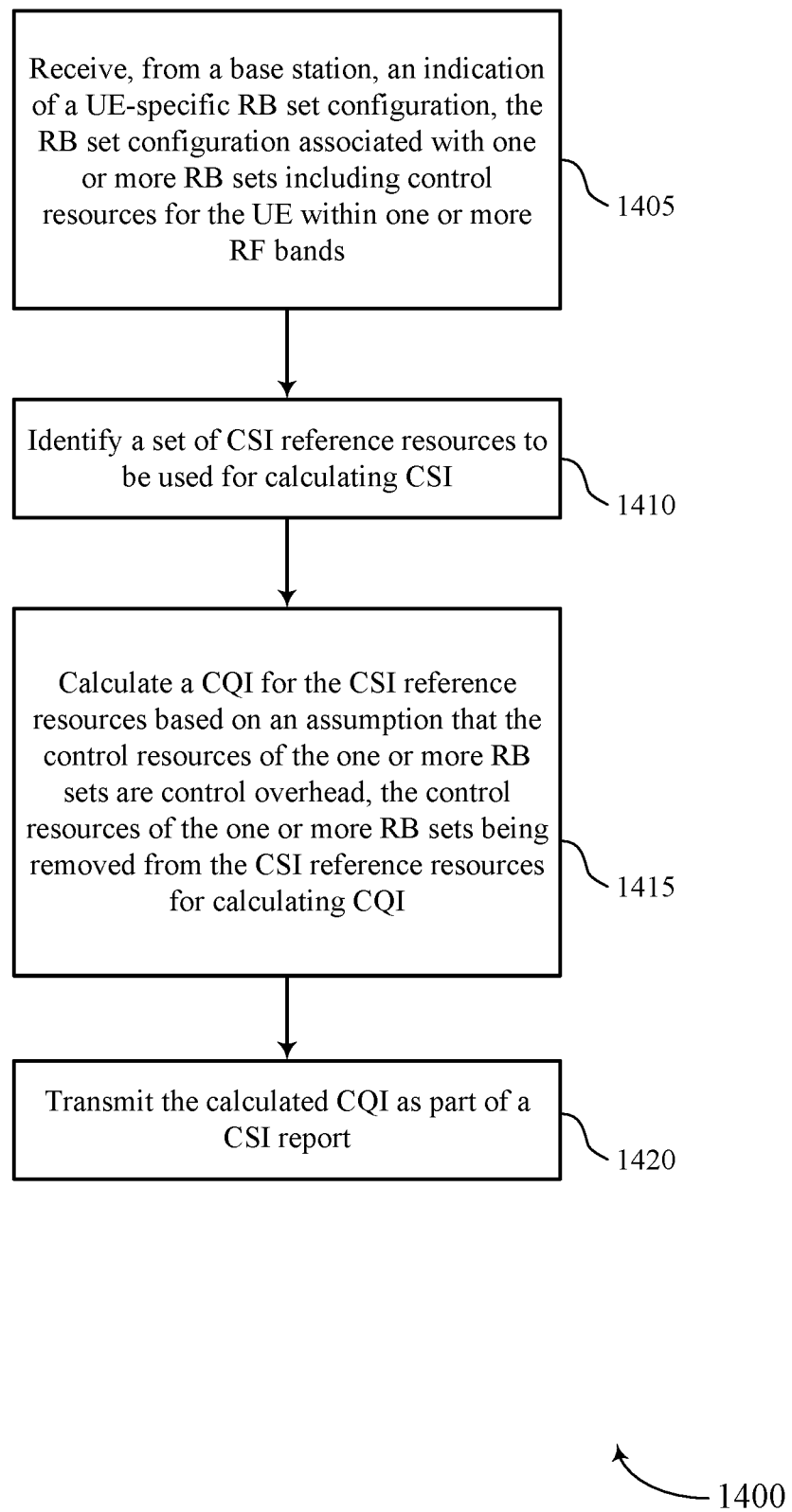

FIG. 14 shows a flowchart illustrating a method 1400 for channel state information computation using a control resource assumption in accordance with aspects of the present disclosure. The operations of method 1400 may be implemented by a UE 115 or its components as described herein. For example, the operations of method 1400 may be performed by a UE CSI manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may receive, from a base station 105, an indication of a UE-specific RB set configuration, the RB set configuration associated with one or more RB sets comprising control resources for the UE 115 within one or more RF bands. The operations of 1405 may be performed according to the methods described herein. In certain examples, aspects of the operations of 1405 may be performed by a RB set configuration receiver as described with reference to FIGS. 5 through 8.

At 1410 the UE 115 may identify a set of CSI reference resources to be used for calculating CSI. The operations of 1410 may be performed according to the methods described herein. In certain examples, aspects of the operations of 1410 may be performed by a reference resource identifier as described with reference to FIGS. 5 through 8.

At 1415 the UE 115 may calculate a CQI for the CSI reference resources based at least in part on an assumption that the control resources of the one or more RB sets are control overhead, the control resources of the one or more RB sets being removed from the CSI reference resources for calculating CQI. The operations of 1415 may be performed according to the methods described herein. In certain examples, aspects of the operations of 1415 may be performed by a CSI calculator as described with reference to FIGS. 5 through 8.

At 1420 the UE 115 may transmit the calculated CQI as part of the CSI report. The operations of 1420 may be performed according to the methods described herein. In certain examples, aspects of the operations of 1420 may be performed by a CSI reporter as described with reference to FIGS. 5 through 8.

Figure 15:
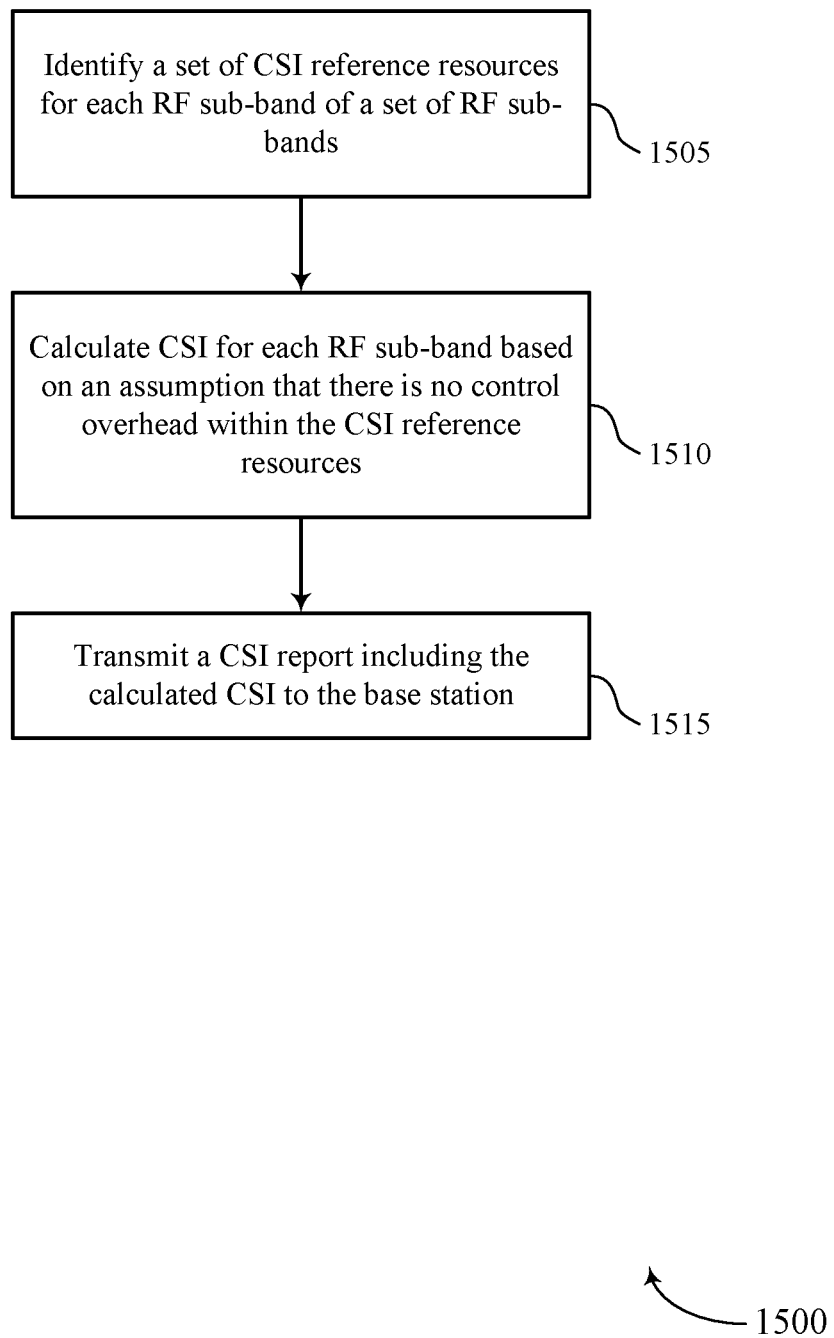

FIG. 15 shows a flowchart illustrating a method 1500 for channel state information computation using a control resource assumption in accordance with aspects of the present disclosure. The operations of method 1500 may be implemented by a UE 115 or its components as described herein. For example, the operations of method 1500 may be performed by a UE CSI manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1505 the UE 115 may identify a set of CSI reference resources for each RF sub-band of a plurality of RF sub-bands. The operations of 1505 may be performed according to the methods described herein. In certain examples, aspects of the operations of 1505 may be performed by a reference resource identifier as described with reference to FIGS. 5 through 8.

At 1510 the UE 115 may calculate CSI for each RF sub-band based at least in part on an assumption that there is no control overhead within the CSI reference resources. The operations of 1510 may be performed according to the methods described herein. In certain examples, aspects of the operations of 1510 may be performed by a CSI calculator as described with reference to FIGS. 5 through 8.

At 1515 the UE 115 may transmit a CSI report comprising the calculated CSI to the base station 105. The operations of 1515 may be performed according to the methods described herein. In certain examples, aspects of the operations of 1515 may be performed by a CSI reporter as described with reference to FIGS. 5 through 8.

Figure 16:
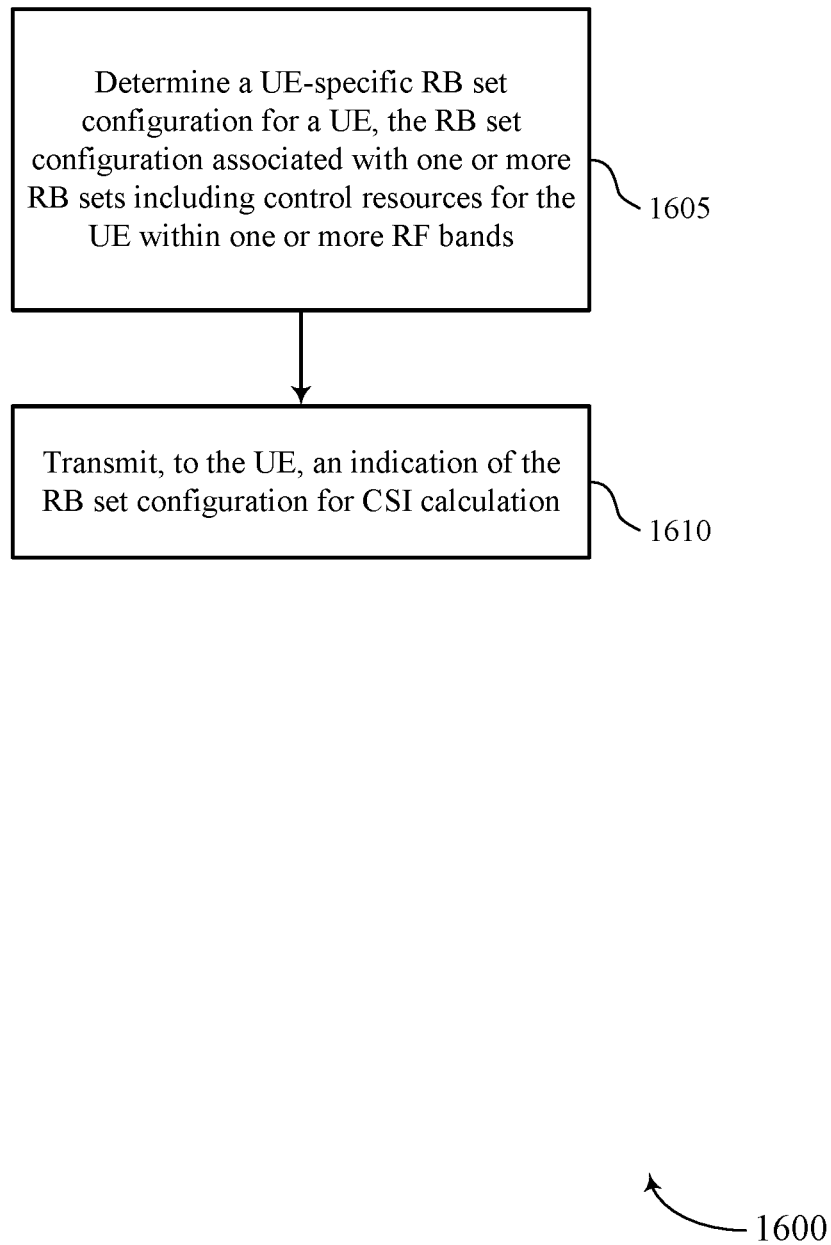

FIG. 16 shows a flowchart illustrating a method 1600 for channel state information computation using a control resource assumption in accordance with aspects of the present disclosure. The operations of method 1600 may be implemented by a base station 105 or its components as described herein. For example, the operations of method 1600 may be performed by a base station CSI manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At 1605 the base station 105 may determine a UE-specific RB set configuration for a UE 115, the RB set configuration associated with one or more RB sets comprising control resources for the UE 115 within one or more RF bands. The operations of 1605 may be performed according to the methods described herein. In certain examples, aspects of the operations of 1605 may be performed by a RB set configuration identifier as described with reference to FIGS. 9 through 12.

At 1610 the base station 105 may transmit, to the UE 115, an indication of the RB set configuration for CSI calculation. The operations of 1610 may be performed according to the methods described herein. In certain examples, aspects of the operations of 1610 may be performed by a RB set configuration transmitter as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Thus, in one aspect CSI may be calculated based on a number of the one or more RB sets and a size of the one or more RB sets, wherein the number of the one or more RB sets and the size of the one or more RB sets may be in accordance with the RB set configuration. Some examples of the method, apparatus, and non-transitory computer-readable medium described above may further include processes, features, means, or instructions for calculating the CSI based at least in part on an assumption that each of the one or more RB sets may be assigned to an sPDCCH. Some examples of the method, apparatus, and non-transitory computer-readable medium described above may further include processes, features, means, or instructions for calculating the CSI based at least in part on an assumption that each of the one or more RB sets may be unavailable for data transmissions, wherein the CSI report may be based on a wideband CSI reporting scheme.

Some examples of the method, apparatus, and non-transitory computer-readable medium described above may further include processes, features, means, or instructions for determining that a portion of a sub-band of the one or more RF bands may be overlapping with the one or more RB sets based at least in part on the RB set configuration. Some examples of the method, apparatus, and non-transitory computer-readable medium described above may further include processes, features, means, or instructions for calculating the CSI based at least in part on an assumption that the portion of the sub-band may be unavailable for data transmissions, wherein the CSI report may be based on a sub-band CSI reporting scheme.

Some examples of the method, apparatus, and non-transitory computer-readable medium described above may further include processes, features, means, or instructions for performing rate matching around a first portion of the one or more RB sets that comprises an sPDCCH based at least in part on an assumption that a second portion of the one or more RB sets may be available for data transmissions, the first portion being different from the second portion. In some examples of the method, apparatus, and non-transitory computer-readable medium described above, the sPDCCH comprises an uplink resource grant, or a downlink resource grant, or a combination thereof.

Some examples of the method, apparatus, and non-transitory computer-readable medium described above may further include processes, features, means, or instructions for performing rate matching around a first portion of a first RB set that comprises an sPDCCH based at least in part on an assumption that a second portion of the first RB sets may be available for data transmissions, the first portion being different from the second portion. Some examples of the method, apparatus, and non-transitory computer-readable medium described above may further include processes, features, means, or instructions for performing rate matching around a second RB set. In some examples of the method, apparatus, and non-transitory computer-readable medium described above, the sPDCCH comprises an uplink resource grant, or a downlink resource grant, or a combination thereof.

Some examples of the method, apparatus, and non-transitory computer-readable medium described above may further include processes, features, means, or instructions for identifying a set of CSI reference resources to be used for calculating CSI. Some examples of the method, apparatus, and non-transitory computer-readable medium described above may further include processes, features, means, or instructions for calculating a CQI for the CSI reference resources based at least in part on an assumption that the control resources of the one or more RB sets may be control overhead, the control resources of the one or more RB sets being removed from the CSI reference resources for calculating CQI. Some examples of the method, apparatus, and non-transitory computer-readable medium described above may further include processes, features, means, or instructions for transmitting the calculated CQI as part of the CSI report.

Some examples of the method, apparatus, and non-transitory computer-readable medium described above may further include processes, features, means, or instructions for transmitting the CSI report during a first TTI that may have a duration that may be less than that of a second TTI, wherein the first TTI comprises a sTTI. Some examples of the method, apparatus, and non-transitory computer-readable medium described above may further include processes, features, means, or instructions for receiving the RB set configuration via radio resource control (RRC) messaging. In some examples of the method, apparatus, and non-transitory computer-readable medium described above, the one or more RF bands comprise a wideband RF band or RF sub-bands.

In some examples of the method, apparatus, and non-transitory computer-readable medium described above, a first RF sub-band of the plurality of RF sub-bands may be scheduled by a first RB set in accordance with an RF set configuration, the first RB set being located outside of the first RF sub-band. Some examples of the method, apparatus, and non-transitory computer-readable medium described above may further include processes, features, means, or instructions for calculating CSI for the first RF sub-band based at least in part on an assumption that a second RB set located within the second RF sub-band may be available for data transmissions. Some examples of the method, apparatus, and non-transitory computer-readable medium described above may further include processes, features, means, or instructions for calculating CSI for the first RF sub-band based at least in part on an assumption that the first RF sub-band excludes a second RF set.

Some examples of the method, apparatus, and non-transitory computer-readable medium described above may further include processes, features, means, or instructions for receiving a CSI report from the UE, the CSI report comprising CSI that may be based at least in part on the RB set configuration. Some examples of the method, apparatus, and non-transitory computer-readable medium described above may further include processes, features, means, or instructions for receiving the CSI report during a TTI that may have a duration that may be less than that of another TTI.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1 ×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA.

A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving, from a base station, an indication of a UE-specific resource block (RB) set configuration, the RB set configuration associated with one or more RB sets comprising control resources for the UE within one or more radio frequency (RF) bands;
    calculating channel state information (CSI) based at least in part on the RB set configuration and on a control overhead assumption that each of the one or more RB sets are assigned to a shortened physical downlink control channel (sPDCCH); and
    transmitting a CSI report comprising the calculated CSI to the base station.

2. The method of claim 1, further comprising:
    calculating the CSI based on a number of the one or more RB sets and a size of the one or more RB sets, wherein the number of the one or more RB sets and the size of the one or more RB sets are in accordance with the RB set configuration.

3. The method of claim 1, further comprising:
    calculating the CSI based at least in part on the control overhead assumption that each of the one or more RB sets are unavailable for data transmissions, wherein the CSI report is based on a wideband CSI reporting scheme.

4. The method of claim 1, further comprising:
    determining that a portion of a sub-band of the one or more RF bands is overlapping with the one or more RB sets based at least in part on the RB set configuration; and
    calculating the CSI based at least in part on the control overhead assumption that the portion of the sub-band is unavailable for data transmissions, wherein the CSI report is based on a sub-band CSI reporting scheme.

5. The method of claim 1, further comprising:
    performing rate matching around a first portion of the one or more RB sets that comprises a shortened physical downlink control channel (sPDCCH) based at least in part on the control overhead assumption that a second portion of the one or more RB sets is available for data transmissions, the first portion being different from the second portion.

6. The method of claim 5, wherein the sPDCCH comprises an uplink resource grant, or a downlink resource grant, or a combination thereof.

7. The method of claim 1, further comprising:
    performing rate matching around a first portion of a first RB set that comprises a shortened physical downlink control channel (sPDCCH) based at least in part on the control overhead assumption that a second portion of the first RB sets is available for data transmissions, the first portion being different from the second portion; and
    performing rate matching around a second RB set.

8. The method of claim 7, wherein the sPDCCH comprises an uplink resource grant, or a downlink resource grant, or a combination thereof.

9. The method of claim 1, further comprising:
    identifying a set of CSI reference resources to be used for calculating CSI;
    calculating a channel quality indicator (CQI) for the CSI reference resources based at least in part on the control overhead assumption that the control resources of the one or more RB sets are control overhead, the control resources of the one or more RB sets being removed from the CSI reference resources for calculating CQI; and
    transmitting the calculated CQI as part of the CSI report.

10. The method of claim 1, further comprising:
    transmitting the CSI report during a first transmission time interval (TTI) that has a duration that is less than that of a second TTI, wherein the first TTI comprises a short TTI (sTTI).

11. The method of claim 1, further comprising:
    receiving the RB set configuration via radio resource control (RRC) messaging.

12. The method of claim 1, wherein the one or more RF bands comprise a wideband RF band or RF sub-bands.

13. A method for wireless communication at a user equipment (UE), comprising:
    identifying a set of channel state information (CSI) reference resources for each radio frequency (RF) sub-band of a plurality of RF sub-bands, wherein a first RF sub-band of the plurality of RF sub-bands is scheduled by a first resource block (RB) set in accordance with an RB set configuration, the first RB set being located outside of the first RF sub-band;
    identifying a control overhead assumption, wherein the control overhead assumption is that there is no control overhead within the CSI reference resources;
    calculating channel state information (CSI) for each RF sub-band based at least in part on the control overhead assumption; and
    transmitting a CSI report comprising the calculated CSI to the base station.

14. The method of claim 13, further comprising:
    calculating CSI for a first RF sub-band based at least in part on an additional control overhead assumption that a second RB set located within the second RF sub-band is available for data transmissions.

15. The method of claim 13, further comprising:
calculating CSI for a first RF sub-band based at least in part on an additional control overhead assumption that the first RF sub-band excludes a second RF set.

16. A user equipment (UE) for wireless communication, comprising:
a processor;
memory in electronic communication with the processor; and
instructions stored in the memory and operable, when executed by the processor, to cause the UE to:
receive, from a base station, an indication of a UE-specific resource block (RB) set configuration, the RB set configuration associated with one or more RB sets comprising control resources for the UE within one or more radio frequency (RF) bands;
calculate channel state information (CSI) based at least in part on the RB set configuration and on a control overhead assumption that each of the one or more RB sets are assigned to a shortened physical downlink control channel (sPDCCH); and
transmit a CSI report comprising the calculated CSI to the base station.

17. The UE of claim 16, wherein the instructions are operable to cause the processor to:
calculate the CSI based on a number of the one or more RB sets and a size of the one or more RB sets, wherein the number of the one or more RB sets and the size of the one or more RB sets are in accordance with the RB set configuration.

18. The UE of claim 16, wherein the instructions are operable to cause the processor to:
calculate the CSI based at least in part on the control overhead assumption that each of the one or more RB sets are unavailable for data transmissions, wherein the CSI report is based on a wideband CSI reporting scheme.

19. The UE of claim 16, wherein the instructions are operable to cause the processor to:
determine that a portion of a sub-band of the one or more RF bands is overlapping with the one or more RB sets based at least in part on the RB set configuration; and
calculate the CSI based at least in part on the control overhead assumption that the portion of the sub-band is unavailable for data transmissions, wherein the CSI report is based on a sub-band CSI reporting scheme.

20. The UE of claim 16, wherein the instructions are operable to cause the processor to:
perform rate matching around a first portion of the one or more RB sets that comprises a shortened physical downlink control channel (sPDCCH) based at least in part on the control overhead assumption that a second portion of the one or more RB sets is available for data transmissions, the first portion being different from the second portion.

21. The UE of claim 16, wherein the instructions are operable to cause the processor to:
perform rate matching around a first portion of a first RB set that comprises a shortened physical downlink control channel (sPDCCH) based at least in part on the control overhead assumption that a second portion of the first RB sets is available for data transmissions, the first portion being different from the second portion; and
perform rate matching around a second RB set.

22. The UE of claim 16, wherein the instructions are operable to cause the processor to:
identify a set of CSI reference resources to be used for calculating CSI;
calculate a channel quality indicator (CQI) for the CSI reference resources based at least in part on the control overhead assumption that the control resources of the one or more RB sets are control overhead, the control resources of the one or more RB sets being removed from the CSI reference resources for calculating CQI; and
transmit the calculated CQI as part of the CSI report.

23. The UE of claim 16, wherein the instructions are operable to cause the processor to:
transmit the CSI report during a first transmission time interval (TTI) that has a duration that is less than that of a second TTI, wherein the first TTI comprises a short TTI (sTTI).

24. An apparatus for wireless communication, comprising:
a processor;
memory in electronic communication with the processor; and
instructions stored in the memory and operable, when executed by the processor, to cause the apparatus to:
identify a set of channel state information (CSI) reference resources for each radio frequency (RF) sub-band of a plurality of RF sub-bands, wherein a first RF sub-band of the plurality of RF sub-bands is scheduled by a first resource block (RB) set in accordance with an RB set configuration, the first RB set being located outside of the first RF sub-band;
identify a control overhead assumption, wherein the control overhead assumption is that there is no control overhead within the CSI reference resources;
calculate channel state information (CSI) for each RF sub-band based at least in part on the control overhead assumption; and
transmit a CSI report comprising the calculated CSI to the base station.

25. The apparatus of claim 24, wherein the instructions are operable to cause the processor to:
calculate CSI for the first RF sub-band based at least in part on an additional control overhead assumption that a second RB set located within the second RF sub-band is available for data transmissions.

26. The apparatus of claim 24, wherein the instructions are operable to cause the processor to:
calculate CSI for the first RF sub-band based at least in part on an additional control overhead assumption that the first RF sub-band excludes a second RF set.

* * * * *